US010376959B2

(12) United States Patent
Motoya

(10) Patent No.: US 10,376,959 B2
(45) Date of Patent: Aug. 13, 2019

(54) LAMINATION MOLDING APPARATUS

(71) Applicant: Sodick Co., Ltd., Kanagawa (JP)

(72) Inventor: Kyokatsu Motoya, Kanagawa (JP)

(73) Assignee: Sodick Co., Ltd., Kanagawa (JP)

(*) Notice: Subject to any disclaimer, the term of this patent is extended or adjusted under 35 U.S.C. 154(b) by 157 days.

(21) Appl. No.: 15/800,361

(22) Filed: Nov. 1, 2017

(65) Prior Publication Data

US 2018/0126459 A1   May 10, 2018

(30) Foreign Application Priority Data

Nov. 4, 2016   (JP) ................................. 2016-216750

(51) Int. Cl.
*B22F 3/105*       (2006.01)
*B33Y 30/00*       (2015.01)
(Continued)

(52) U.S. Cl.
CPC .......... *B22F 3/1055* (2013.01); *B22F 3/1007* (2013.01); *B22F 3/24* (2013.01); *B29C 64/153* (2017.08); *B29C 64/188* (2017.08); *B33Y 30/00* (2014.12); *G05B 19/4099* (2013.01); *B22F 2003/1056* (2013.01); *B22F 2003/1057* (2013.01); *B22F 2003/247* (2013.01); *B22F 2998/10* (2013.01); *B22F 2999/00* (2013.01); *B33Y 50/02* (2014.12); *Y02P 10/295* (2015.11)

(58) Field of Classification Search
CPC .............................. B23K 26/02; B23K 26/035
See application file for complete search history.

(56) References Cited

U.S. PATENT DOCUMENTS

2002/0041818 A1* 4/2002 Abe ...................... B22F 3/1055
419/7

FOREIGN PATENT DOCUMENTS

| JP | 2002-115004 A | 4/2002 |
| JP | 2016-060131 A | 4/2016 |
| JP | 2016113679 A  | 6/2016 |

OTHER PUBLICATIONS

Japanese Office Action dated Apr. 17, 2018, in connection with counterpart JP Application No. 2016-216750 (4 pgs., including English translation).

* cited by examiner

*Primary Examiner* — Matthew J Daniels
*Assistant Examiner* — Nicholas J Chidiac
(74) *Attorney, Agent, or Firm* — Maier & Maier, PLLC

(57) ABSTRACT

According to the present invention, a lamination molding apparatus configured to mold a desired lamination molded object based on a project file, comprising: a chamber covering a molding region and being filled with an inert gas; a laser beam emitter configured to irradiate material powder with a laser beam for sintering the material powder, in an irradiation region on a material powder layer formed on a molding region, a cutting machine configured to move a cutting tool, within the chamber, for cutting a predetermined cutting allowance from a sintered layer obtained by sintering the material powder a calculation means configured to calculate an amount of displacement between a target irradiation position and an actual irradiation position of the laser beam, and to determine a recommended value of a size of the cutting allowance based on a time transition of the amount of displacement or to generate a new project file containing a size of the cutting allowance set based on a time transition of the amount of displacement, is provided.

10 Claims, 17 Drawing Sheets

(51) Int. Cl.
*B22F 3/10* (2006.01)
*B22F 3/24* (2006.01)
*G05B 19/4099* (2006.01)
*B29C 64/153* (2017.01)
*B29C 64/188* (2017.01)
*B33Y 50/02* (2015.01)

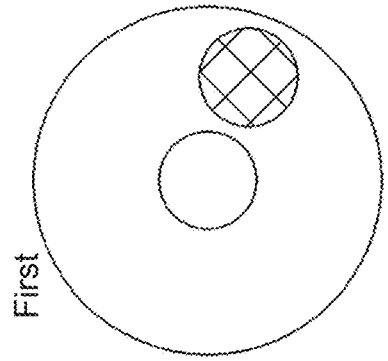
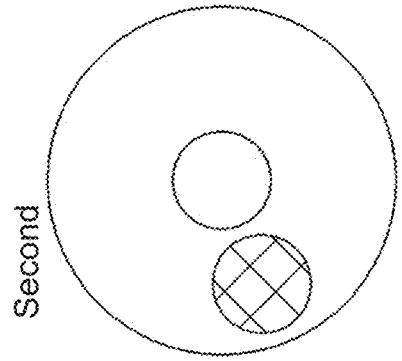
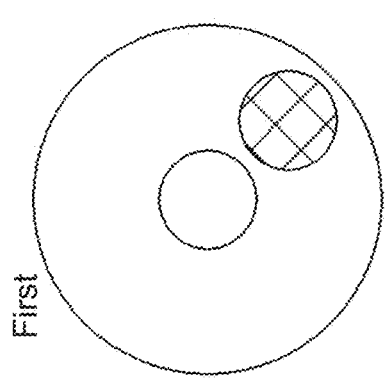
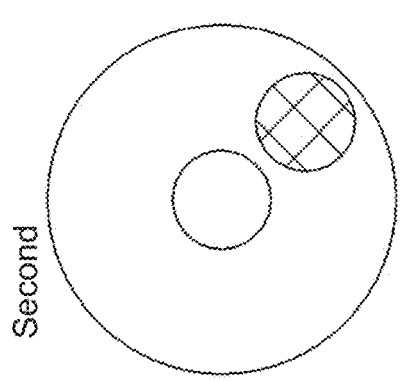
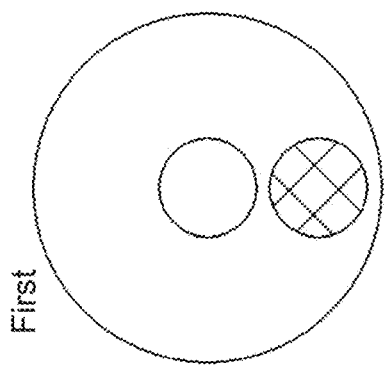
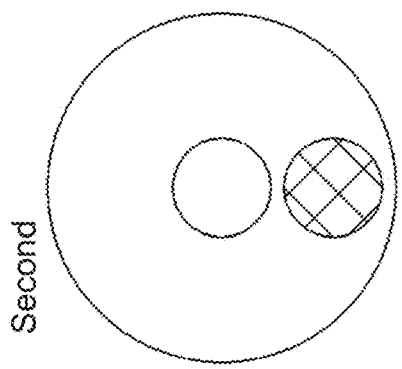
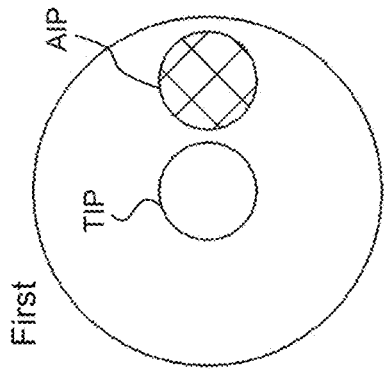
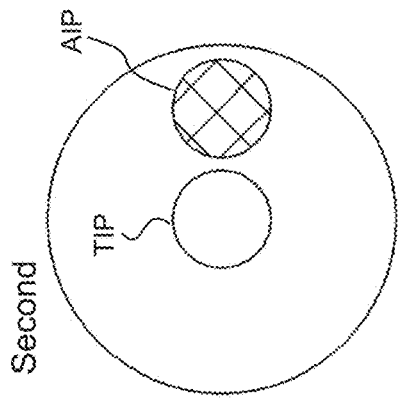
Fig.11A Translational displacement in X direction
Fig.11B Translational displacement in Y direction
Fig.11C Translational displacement in XY direction
Fig.11D Rotational displacement
TIP: Target irradiation position
AIP: Actual irradiation position Fig. 13 Time transition of amount of displacement Fig. 14 Time transition of subtraction of amount of displacement (Corresponding to Fig. 13)

Fig. 15 Time transition of subtraction of amount of displacement (Not converge)

LAMINATION MOLDING APPARATUS

BACKGROUND OF THE INVENTION

Field of the Invention

The present invention relates to a lamination molding apparatus wherein in particular, a sintered layer formed so as to be larger by a cutting allowance portion than a desired shape of a molded object, is laminated together and; the cutting allowance is removed by cutting.

Background of the Invention

In a lamination molding method using laser beam, inside a sealed chamber filled with an inert gas, a very thin material powder layer is formed on a molding table capable of moving vertically, followed by irradiation of a predetermined position of the material powder layer with a laser beam, thereby sintering the material powder. Patent Literature 1 discloses the lamination molding apparatus in which during the process of molding, the cutting allowance included in a sintered body obtained by sintering material powder is removed by cutting using a cutting tool such as an end mill movable in synchronization in a vertical one-axis and horizontal two-axis directions. The sintered body is formed intentionally oversize and the cutting allowance is a planned deviation between an exact outer dimension and a desired outer dimension of the sintered body. Over the combination and repetition of these steps, a desired molded object is formed.

In such a lamination molding apparatus, a sintered layer is formed in such a way that the irradiation region of the laser beam is set larger than the desired shape of the molded object by the cutting allowance part. The molded object formed by laminating and integrating a plurality of sintered layers is formed with high accuracy so that the final shape becomes a desired shape by removing, by cutting, the cutting allowance which is an unnecessary part of the surface of the sintered layer created during molding.

PRIOR ART DOCUMENTS

Patent Literature

[Patent Literature 1] JP2016-113679

SUMMARY OF INVENTION

Technical Problem

However, the size of the cutting allowance required differs depending on the state of the lamination molding apparatus, the environment to be installed, etc. This is caused by the fact that a difference occurs between laser beam coordinates and spindle coordinates because the temperature of a lamination molding apparatus, the temperature of a laser beam scanning unit of a laser beam emitter, the atmosphere in a chamber covering the molded object, change over time.

In such a problem, it is difficult to judge the optimum value of the size of the cutting allowance; therefore, it is common to set it larger than necessary. However, increasing the cutting allowance lengthens the cutting time by that much, and further, the time to mold the lamination molded object is also prolonged.

The present invention has been made by taking these circumstances into consideration. An objective of the present invention is to provide a lamination molding apparatus capable of determining the recommended value of the cutting allowance.

Means to Solve the Problem

According to the present invention, a lamination molding apparatus configured to mold a desired lamination molded object based on a project file, comprising: a chamber covering a molding region and being filled with an inert gas; a laser beam emitter configured to irradiate material powder with a laser beam for sintering the material powder, in an irradiation region on a material powder layer formed on a molding region, a cutting machine configured to move a cutting tool, within the chamber, for cutting a predetermined cutting allowance from a sintered layer obtained by sintering the material powder a calculation means configured to calculate an amount of displacement between a target irradiation position and an actual irradiation position of the laser beam, and to determine a recommended value of a size of the cutting allowance based on a time transition of the amount of displacement or to generate a new project file containing a size of the cutting allowance set based on a time transition of the amount of displacement, is provided.

Effect of Invention

In the present invention, unlike the prior art such as Patent Literature 1, the amount of displacement between the target irradiation position and actual irradiation position of the laser beam is calculated, and the recommended value of the size of the cutting allowance can be determined based on the time transition of the amount of displacement. This recommended value enables to shorten the time of molding in the future.

Hereinafter, various embodiments of the present invention will be provided. The embodiments provided below can be combined with each other.

Preferably, the calculating means is an arithmetic unit which determines a recommended value of the size of the cutting allowance based on the time transition of the amount of displacement; and further comprising: a computer aided manufacturing (CAM) apparatus configured to generate the new project file in which the size of the cutting allowance is set based on the recommended value.

Preferably, the apparatus is configured to mold the desired lamination molded object based on the generated new project file.

Preferably, the apparatus is configured to mold the desired lamination molded object based on the generated new project file at a previous operation of the lamination molding apparatus.

Preferably, the calculation means is configured to calculate time subtractions of the amount of displacement.

Preferably, the calculation means is configured to determine a first value having a largest absolute value among the time subtractions as the recommended value if the time subtractions converge within a predetermined threshold range.

Preferably, the calculation means is configured to determine a predetermined second value larger than the first value as the recommended value if the time subtractions do not converge within a predetermined threshold range.

Preferably, further comprising: a display device configured to display the recommended value on a screen.

Preferably, the display device is configured to display a warning that the apparatus itself needs maintenance and inspection if the time subtractions do not converge within a predetermined threshold range.

Preferably, further comprising: a molding table configured to be controllable in a vertical direction within the chamber, and an imaging unit configured to capture a subject on the molding table, wherein: the laser beam emitter is configured to sinter the material powder on the molding table and outside the region in which the desired lamination molded object is molded, thereby forming the sintered trace; the imaging unit is configured to capture the sintered trace; and the calculating means is configured to determine the actual irradiation position from the sintered trace captured by the imaging unit and to compare the actual irradiation position with the target irradiation position, thereby calculating the amount of displacement.

BRIEF DESCRIPTION OF THE DRAWINGS

FIGS. 11A-11D are schematic diagrams showing the relation between the target irradiation position and actual irradiation position according to one embodiment of the present invention.

DESCRIPTION OF THE PREFERRED EMBODIMENTS

Hereinafter, some embodiments of the present invention will be described with reference to the drawings. Here, the characteristic matters shown in the embodiments can be combined with each other.

1. EMBODIMENT

Figure 1:
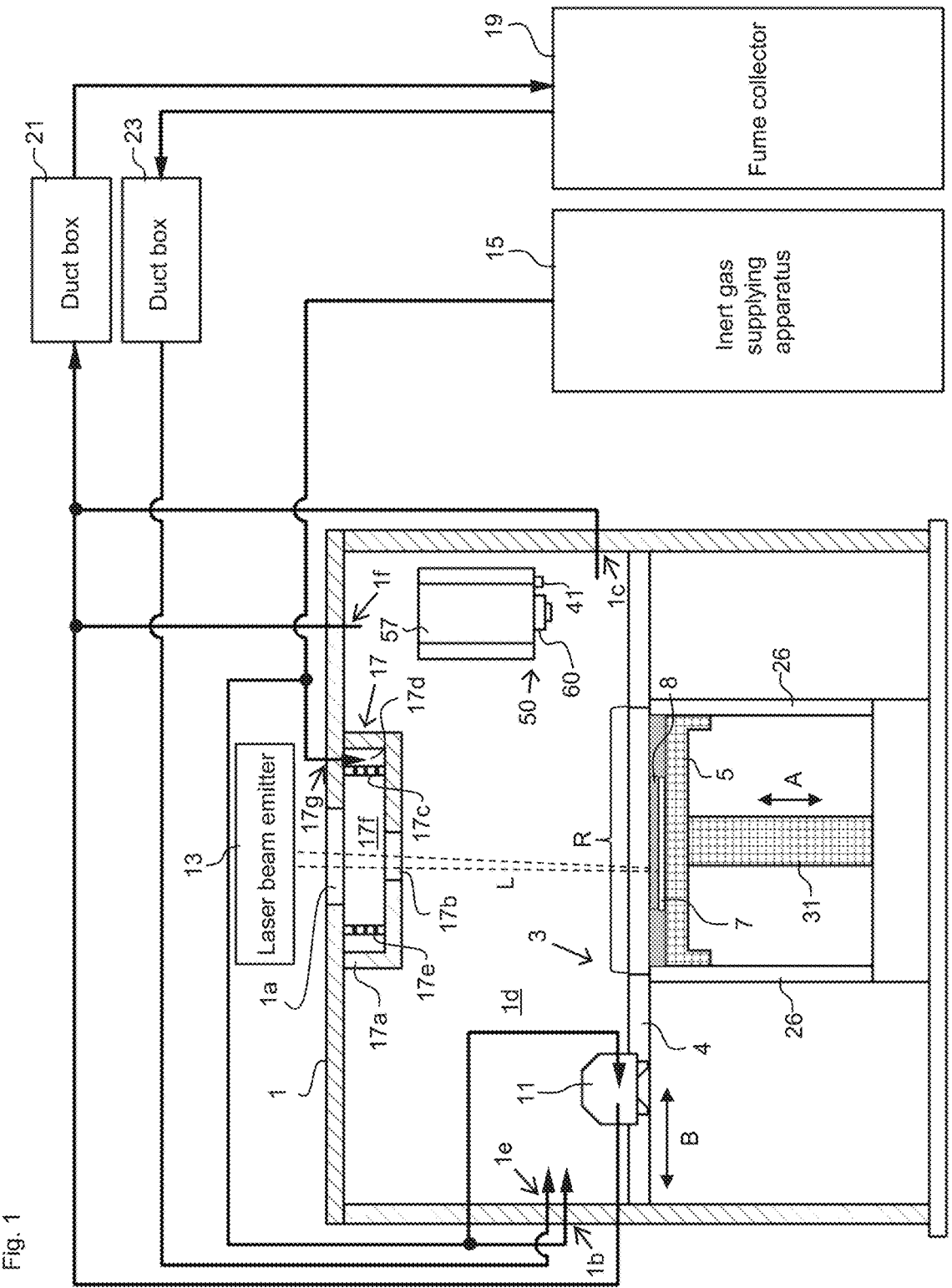
FIG. 1 is a schematic diagram of the lamination molding apparatus according to one embodiment of the present invention.

As shown in FIG. 1, the lamination molding apparatus according to one embodiment of the present invention comprises a chamber 1 and a laser beam emitter 13.

A chamber 1 is filled with a desired concentration of inert gas covering a molding region R. A powder layer forming apparatus 3 is provided inside the chamber 1, and a fume diffusing device 17 is attached on the upper surface portion thereof. The powder layer forming apparatus 3 includes a base 4 and recoater head 11.

The base 4 includes a molding region R in which a lamination molded object is formed. A molding table 5 is provided with the molding region R and is driven by a molding table drive mechanism 31, thereby being capable of moving vertically (direction shown by arrow A in FIG. 1). When the lamination molding apparatus is operated, on the molding table 5, a molding plate 7 is arranged of which area is smaller than the surface area of the molding table 5, and a material powder layer 8 is formed thereon. A predetermined irradiation region existing in the molding region R is substantially consistent with the area surrounded by the contour of a desired three-dimensional molded object.

A powder retaining wall 26 is provided around the molding table 5, and the non-sintered material powder is retained in the powder retaining space surrounded by the powder retaining wall 26 and the molding table 5. Although not shown in FIG. 1, below the powder retaining wall 26, a powder discharging section capable of discharging the material powder in the powder retaining space may be provided. In this case, after completion of the lamination molding, the molding table 5 is descended so as to discharge the non-sintered material powder from the powder discharging section. The material powder discharged is guided to the chute by the chute guide, and then the material powder is retained in the bucket via the chute.

Figure 2:
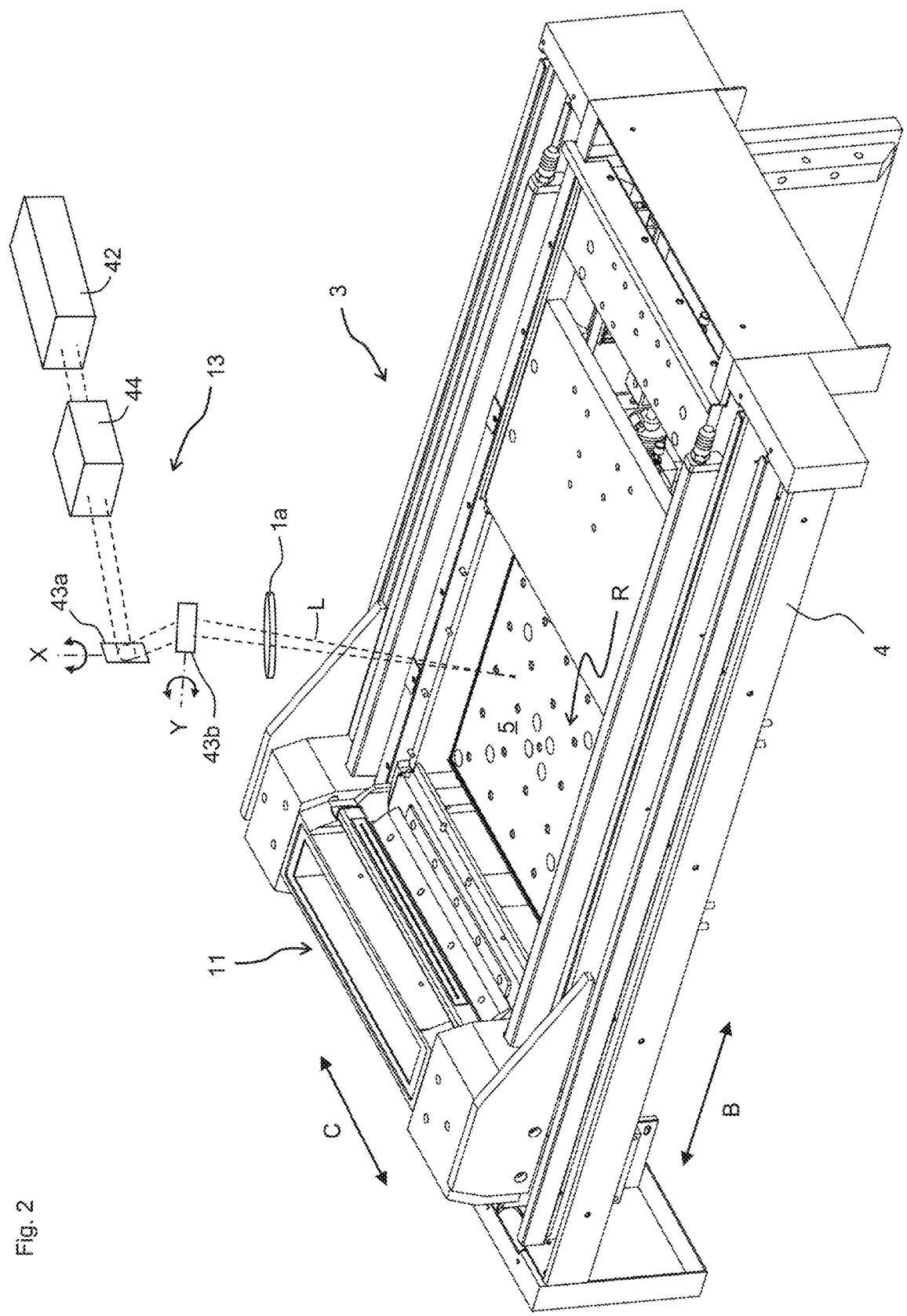
FIG. 2 is a perspective view showing a powder layer forming apparatus 3 and laser beam emitter 13 according to one embodiment of the present invention.
Figure 3:
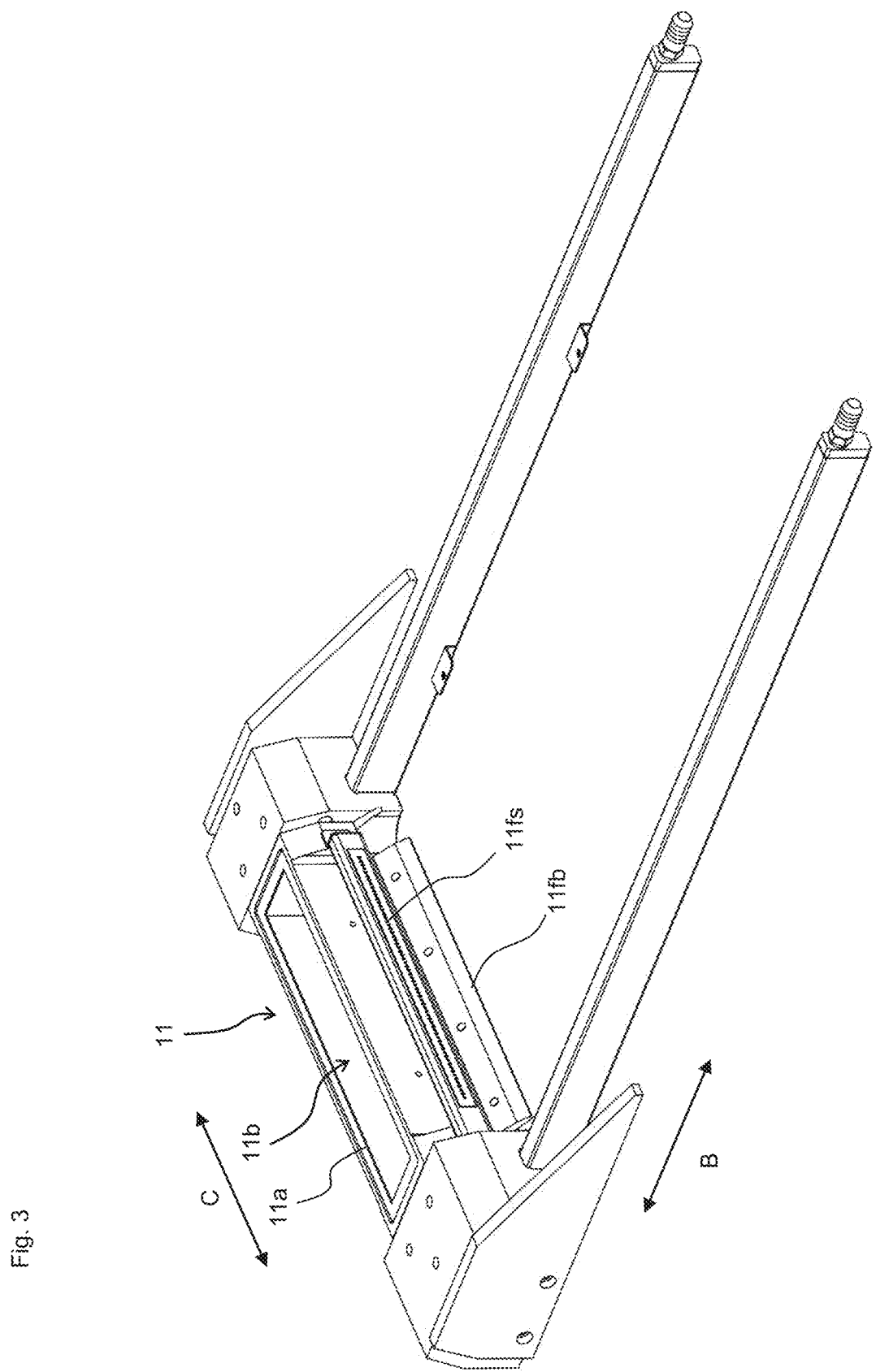
FIG. 3 is a perspective view of a recoater head 11 according to one embodiment of the present invention.
Figure 4:
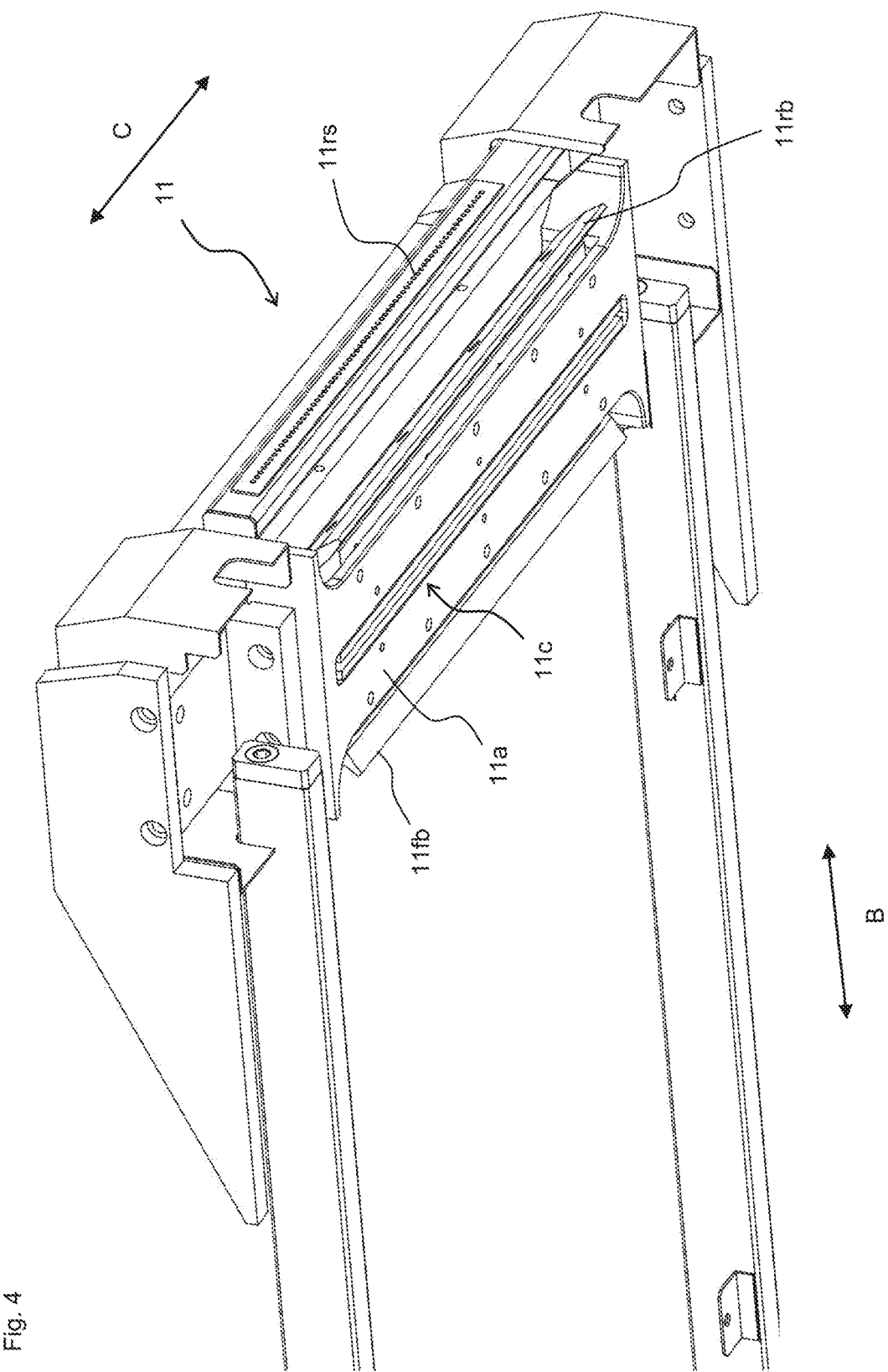
FIG. 4 is a perspective view of a recoater head 11 from another angle according to one embodiment of the present invention.

As shown in FIGS. 2 to 4, the recoater head 11 comprises a material holding section 11a, material supplying section 11b and material discharging section 11c.

The material holding section 11a stores the material powder. Note that the material powder is, for example, metal powder such as iron powder having a sphere shape with an average particle diameter of 20 μm. The material supplying section 11b is provided on the top surface of the material holding section 11a, and is configured to receive the material powder to be supplied from a material supplying device (not shown) to the material holding section 11a. The material discharging section 11c is provided on the bottom surface of the material holding section 11a, and discharges the material powder in the material holding section 11a. Note that the material discharging section 11c has a slit shape which elongates in the horizontal uniaxial direction (direction shown by arrow C) crossing orthogonally with the moving direction (direction shown by arrow B) of the recoater head 11.

Blades 11*fb* and 11*rb*, a recoater head supplying opening 11*fs*, and a recoater head discharging opening 11*rs* are provided on both sides of the recoater head 11, respectively. The blades 11*fb* and 11*rb* supply the material powder. In other words, the blades 11*fb* and 11*rb* form a material powder layer 8 by planarizing the material powder discharged from the material discharging section 11*c*. The recoater head supplying opening 11*fs* and recoater head discharging opening 11*rs* are provided along the horizontal uniaxial direction (direction shown by arrow C) crossing orthogonally with the moving direction (direction shown by arrow B) of the recoater head 11, thereby supplying and discharging the inert gas, respectively (details to be described later). Here, in the present specification, "inert gas" is a gas which substantially does not react with the material powder, and nitrogen gas, argon gas and helium gas can be mentioned for example.

A cutting machine 50 has a machining head 57 provided with a spindle head 60 and imaging unit 41. The machining head 57 moves, to a desired position, the spindle head 60 and imaging unit 41 in synchronization with a vertical one-axis and horizontal two-axis directions so as to be controllable by a machining head driving mechanism (not shown).

Figure 6:
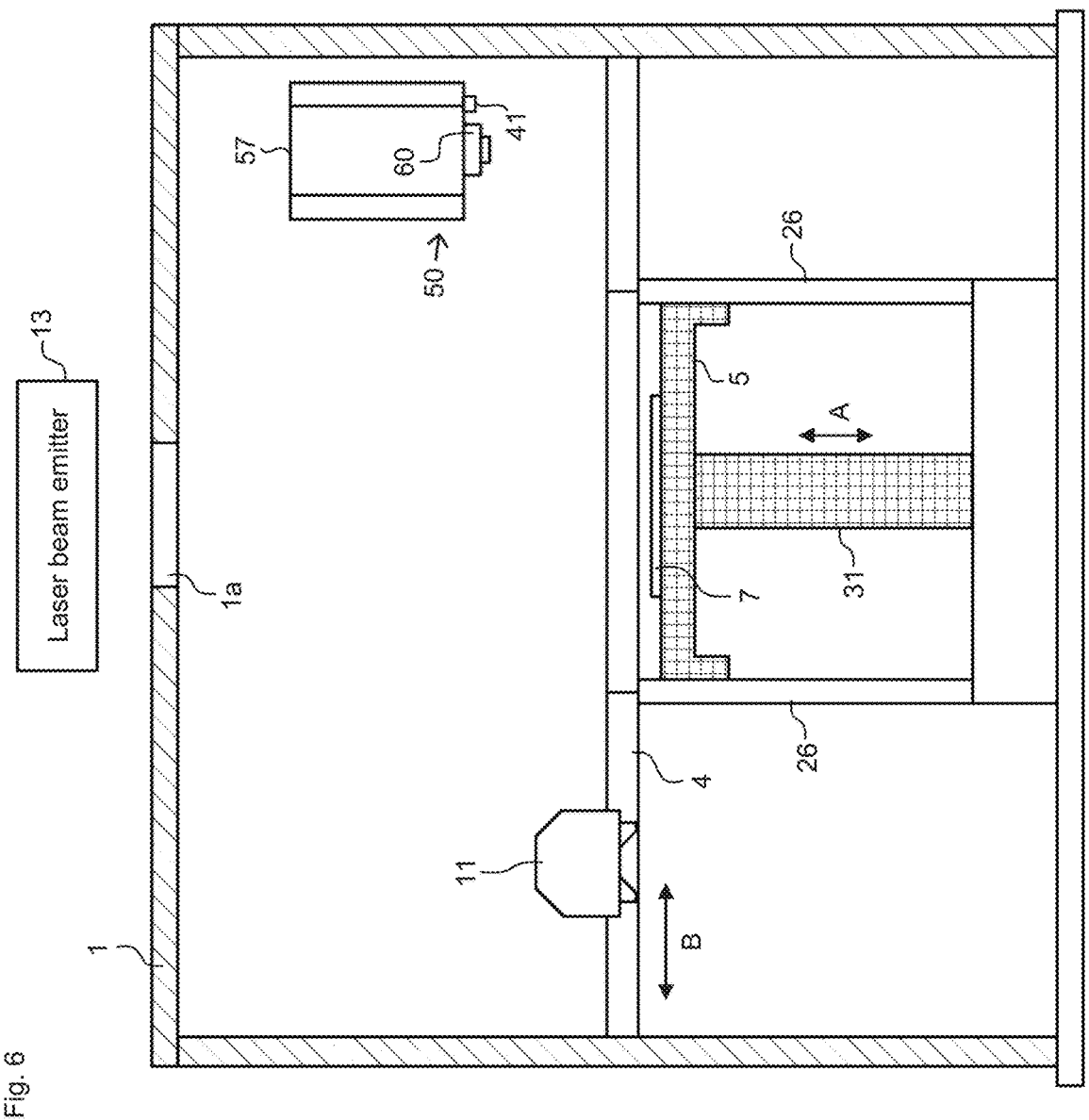
FIGS. 6-8 are diagrams for explaining the lamination molding method using the lamination molding apparatus according to one embodiment of the present invention.
Figure 7:
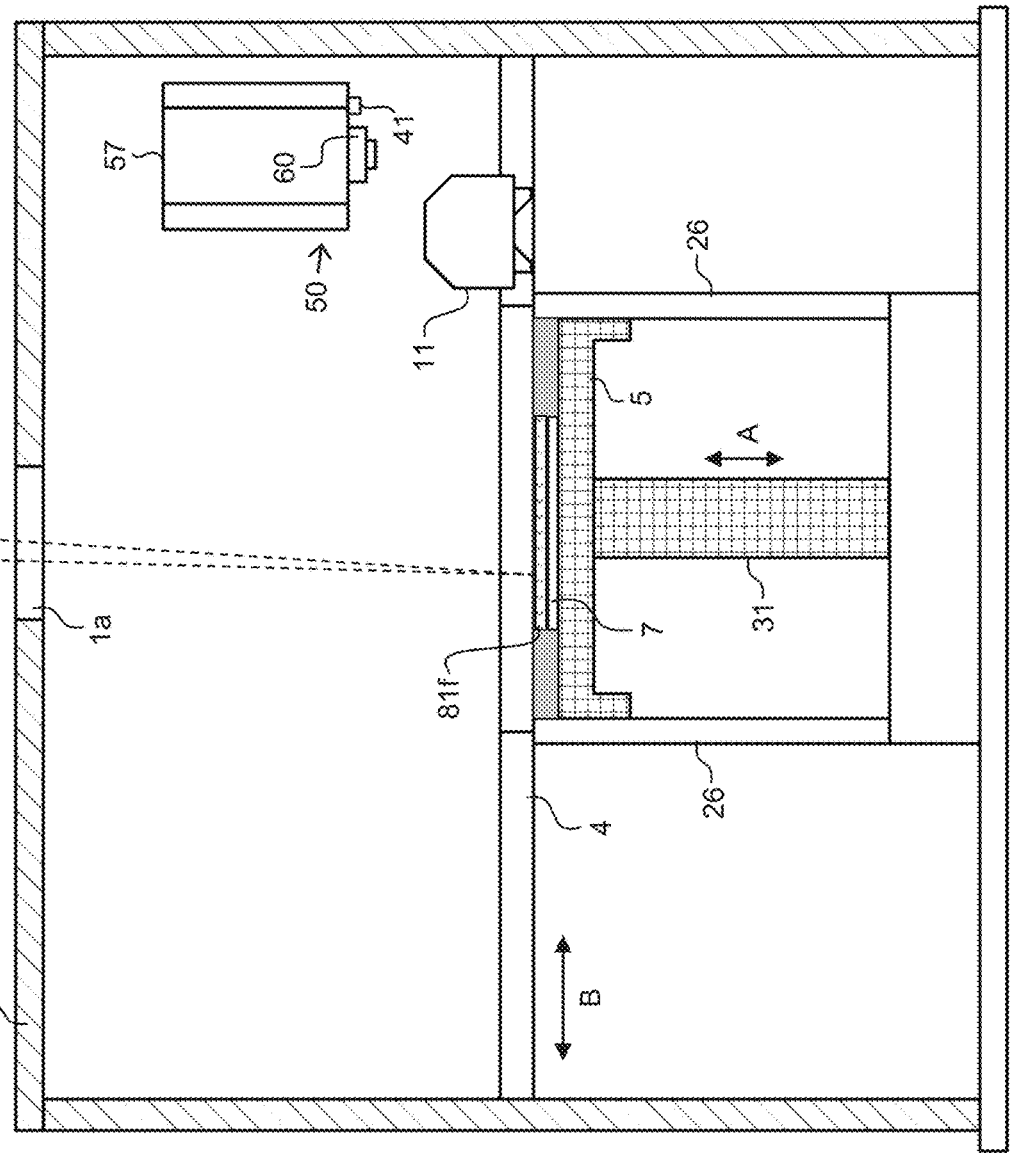
Figure 8:
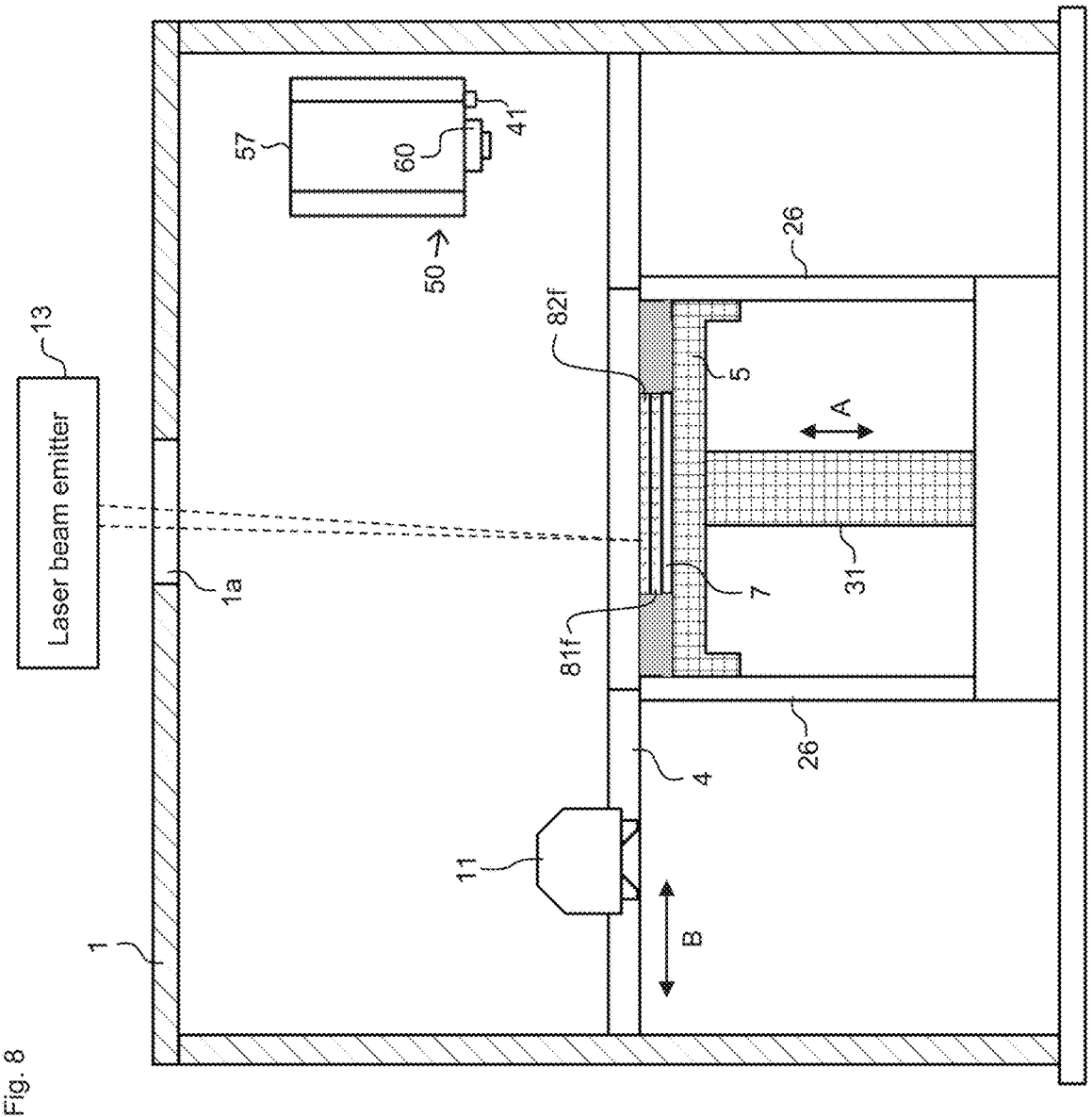

As shown in FIGS. 6-8, the spindle head 60 is configured to rotate with attaching a cutting tool such as an end mill or the like (not shown) such that cutting can be applied to the surface or unnecessary portions of the sintered layer obtained by sintering the material powder. Further, preferably the cutting tool comprises plural kinds of cutting tools, and the cutting tool being used can be exchanged by an automatic tool changer (not shown) even during the molding process.

The imaging unit 41 is an imaging element such as a CCD (Charge-Coupled Device), for example. Then, the imaging unit 41 can capture the sintered trace distinctly from non-sintered material powder, the sintered trace being obtained by sintering the material powder by the laser beam L. That is, by capturing an image of this using the imaging unit 41, the actual irradiation position at the height of the molding table 5 of the laser beam L can be obtained, which can be used for correcting the irradiation position.

Here, since both the spindle head 60 and imaging unit 41 are provided in the same driving system (here, the machining head 57), the actual irradiation position of the laser beam L obtained by capturing of the imaging unit 41 and the plane coordinate system according to a position control of the cutting tool mounted on the spindle head 60 correspond to each other. With this configuration by using the imaging unit 41, it is possible to more precisely associate the planar coordinate system according to the position control of the cutting tool with the plane coordinate system according to the position control of the laser beam L. In the following, the plane coordinate system according to the position control of the cutting tool parallel to the molding region R is simply referred to as the spindle coordinates, and the plane coordinate system according to the position control of the laser beam L parallel to the molding region R is simply referred to as the laser beam coordinates. Details of specific correction processing will be described later.

On the upper surface of the chamber 1, the fume diffusing device 17 is provided so as to cover the window 1*a*. The fume diffusing device 17 is provided with a cylindrical housing 17*a* and a cylindrical diffusing member 17*c* arranged in the housing 17*a*. An inert gas supplying space 17*d* is provided in between the housing 17*a* and the diffusing member 17*c*. Further, on the bottom surface of the housing 17*a*, an opening 17*b* is provided at the inner portion of the diffusing member 17*c*. The diffusing member 17*c* is provided with a plurality of pores 17*e*, and the clean inert gas supplied into the inert gas supplying space 17*d* via the fume diffusing device supplying opening 33*d* is filled into a clean room 17*f* through the pores 17*e*. Then, the clean inert gas filled in the clean room 17*f* is discharged towards below the fume diffusing device 17 through the opening 17*b*.

A laser beam emitter 13 is provided above the chamber 1. The laser beam emitter 13 irradiates, with laser beam L, a predetermined position of the material powder layer 8 formed on the molding region R so as to sinter the material powder at the irradiation position. Specifically, as shown in FIG. 2, the laser beam emitter 13 comprises a laser beam source 42, focus control unit 44 and laser beam scanning unit. In the present embodiment, the laser beam scanning unit is two-axis galvanometer mirrors 43*a* and 43*b*. The galvanometer mirrors 43*a* and 43*b* includes actuators rotating the galvanometer mirrors 43*a* and 43*b*, respectively.

The laser beam source 42 emits the laser beam L. Here, the laser beam L is a laser capable of sintering the material powder, for example, a $CO_2$ laser, fiber laser, YAG laser and the like.

The focus control unit 44 focuses the laser beam L output from the laser beam source 42 and adjusts it to a desired spot diameter. The two-axis galvanometer mirrors 43*a* and 43*b* perform two-dimensional scanning of the laser beam L emitted from the laser beam source 42 controllably. The galvanometer mirror 43*a* scans the laser beam L in the arrow B direction (x-axis direction), and the galvanometer mirror 43*b* scans the laser beam L in the arrow C direction (y-axis direction). Each of the galvanometer mirrors 43*a* and 43*b* is controlled of its rotation angle depending on the size of the rotation angle controlling signal input from a control device (not shown). Accordingly, the laser beam L can be emitted to a desired position by altering the size of the rotation angle controlling signal being input to each of the actuators of the galvanometer mirrors 43*a* and 43*b*.

The laser beam L which passed through the galvanometer mirrors 43*a* and 43*b* further passes through the window 1*a* provided to the chamber 1. Then, the material powder layer 8 formed in the molding region R is irradiated with the laser beam L. The window 1*a* is formed with a material capable of transmitting the laser beam L. For example, in a case where the laser beam L is fiber laser or YAG laser, the window 1*a* can be structured with a quartz glass.

Next, an inert gas supplying/discharging system will be explained. The inert gas supplying/discharging system comprises a plurality of supplying openings and discharging openings of the inert gas provided in the chamber 1, and pipes for connecting each supplying opening and discharging opening to an inert gas supplying apparatus 15 and fume collector 19. In the present embodiment, the supplying openings including the recoater head supplying opening 11*fs*, a chamber supplying opening 1*b*, a sub supplying opening 1*e* and the fume diffusing device supplying opening 17*g*, and the discharging openings including a chamber discharging opening 1*c*, the recoater head discharging opening 11*rs* and sub discharging opening 1*f* are provided.

The recoater head supplying opening 11*fs* is provided so as to depend on the installation position of the chamber discharging opening 1*c* and to face the chamber discharging opening 1*c*. Desirably, the recoater head supplying opening 11*fs* is provided on one side of the recoater head 11 along the direction indicated as the arrow C so as to face the chamber discharging opening 1c when the recoater head 11 is positioned on the opposite side across a predetermined irradiation region with respect to a position at which the material supplying device (not shown) is installed.

The chamber discharging opening 1c is provided on the side wall of the chamber 1 at a certain distance from a predetermined irradiation region so as to face the recoater head supplying opening 11fs. A suction device (not shown) may be provided connecting with the chamber discharging opening 1c. The suction device facilitates eliminating the fume efficiently from the optical path of the laser beam L. In addition, the suction device enables a greater amount of fumes to be discharged through the chamber discharging opening 1c, thereby the fume diffusion within the molding room 1d is alleviated.

The chamber supplying opening 1b is provided on the edge of the base 4 so as to face the chamber discharging opening 1c across a predetermined irradiation region. The chamber supplying opening 1b is selectively switched to open, but instead the recoater head supplying opening 11fs is switched to close when the recoater head 11 is positioned on the opposite side with respect to the recoater head supplying opening 11fs, without placing a predetermined irradiation region therebetween. The chamber supplying opening 1b supplies the inert gas into the chamber discharging opening 1c, of which pressure and flow rate are the same as the inert gas supplied from the recoater head supplying opening 11fs, thereby generating a flow of the inert gas in the same direction. Consequently, stable sintering is beneficially provided.

The recoater head discharging opening 11rs is provided on the opposite side of the side in which the recoater head supplying opening 11fs is provided, of recoater head 11 along the direction shown by arrow C. While the recoater head supplying opening 11fs does not supply the inert gas, in other words, the chamber supplying opening 1b supplies the inert gas, some fume is discharged by generating a flow of the inert gas in the more vicinity of a predetermined irradiation region, thereby eliminating the fume more efficiently from the optical path of the laser beam L.

The inert gas supplying/discharging system according to the present embodiment comprises a sub supplying opening 1e and sub discharging opening 1f. The sub supplying opening 1e is provided on the side wall of the chamber 1 so as to face the first discharging opening supply 34a, and supplies clean inert gas, of which the fume is removed, sent from the fume collector 19 into the molding room 1d. The sub discharging opening 1f is provided above the chamber discharging opening 1c, and discharges the inert gas containing a large amount of fume which remains on the upper side of the chamber 1.

The inert gas supplying system to supply the inert gas into the chamber 1 is connected with the inert gas supplying apparatus 15 and fume collector 19. The inert gas supplying apparatus 15 has a function to supply the inert gas, and is, for example, a device comprising a membrane type nitrogen separator to extract the nitrogen gas from the circumambient air. In the present embodiment, as shown in FIG. 1, the inert gas supplying apparatus 15 is connected to the recoater head supplying opening 11fs, chamber supplying opening 1b and fume diffusing device supplying opening 17g.

The fume collector 19 comprises duct boxes 21 and 23 provided at its upper stream side and its lower stream side, respectively. The inert gas containing fume discharged from the chamber 1 through the chamber discharging opening 1c and sub discharging opening 1f is sent to the fume collector 19 through the duct box 21. Then, fume is removed in the fume collector 19, and the cleaned inert gas is sent to the sub supplying opening 1e of the chamber 1 through the duct box 23. According to such constitution, the inert gas can be recycled.

For the inert gas discharging system as shown in FIG. 1, the chamber discharging opening 1c, recoater head discharging opening 11rs and sub discharging opening 1f are respectively connected with the fume collector 19 through the duct box 21. The inert gas after removal of the fume by the fume collector 19 returns to the chamber 1 and is recycled.

Figure 5:
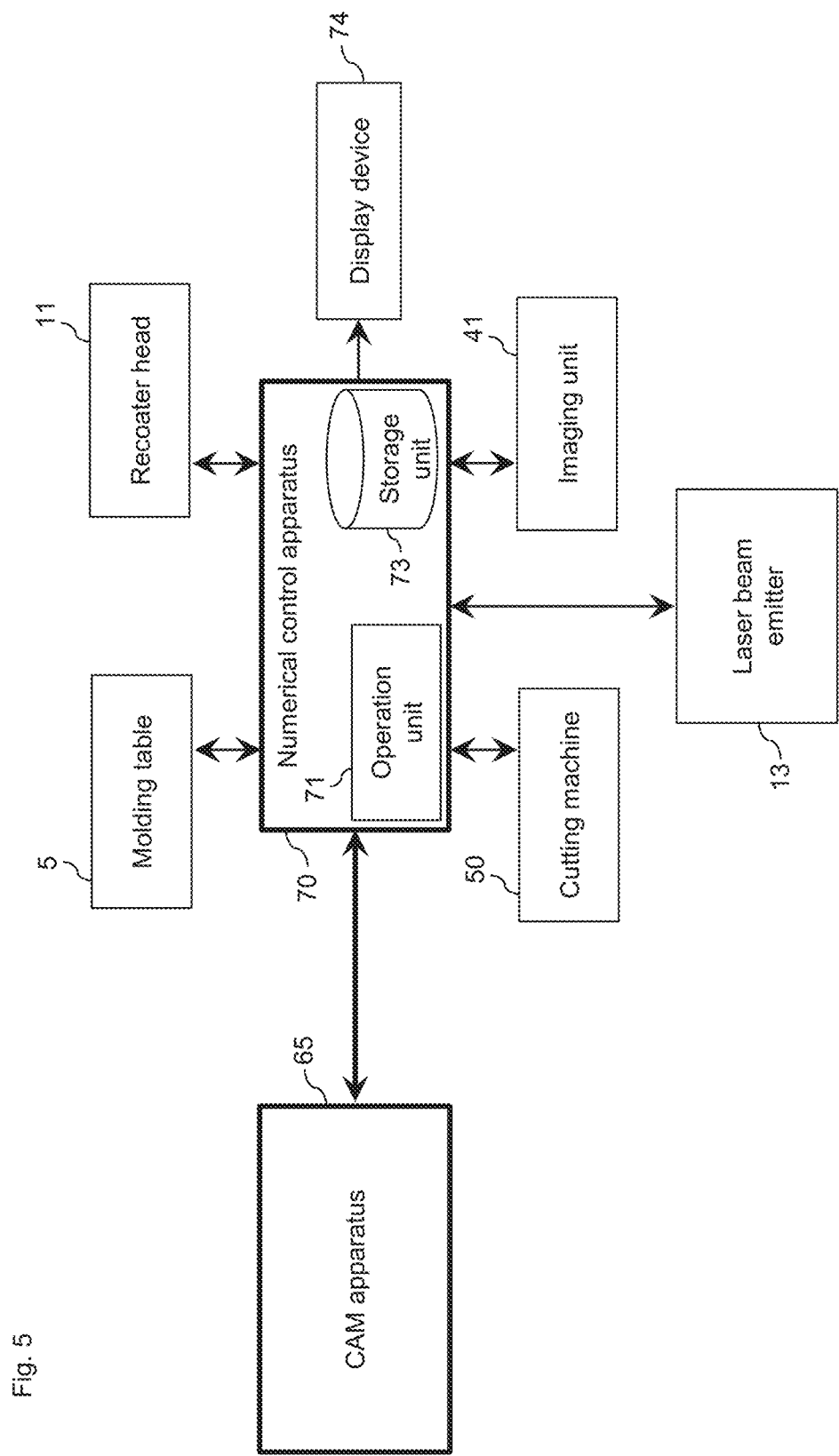
FIG. 5 is a block diagram showing a control system of the lamination molding apparatus according to one embodiment of the present invention.

Next, referring to FIG. 5, a control system of the lamination molding apparatus will be explained. As shown in FIG. 5, the control system comprises a calculation system, U-axis system and laser system. As shown in FIG. 5, the control system includes a CAM apparatus 65 and a numerical control apparatus 70.

The CAM apparatus 65 generates the project file comprising a main program file, cutting program file and molding program file. The main program file forms the desired lamination molded object, the cutting program file removes the cutting allowance from the sintered body composed of a plurality of the sintered layers by cutting, and the molding program file (laser irradiation program file) relates to the irradiation procedure of the laser beam L. Here, the program file for forming the sintered body formed from a plurality of the sintered layers and including the cutting allowance is mainly a main program file and the molding program file.

the numerical control apparatus 70 controls each part of the lamination molding apparatus. As will be described in detail later, the control includes controlling the height of the molding table 5 according to the main program, and outputting the command of the start of the irradiation to a laser control device 90, the command being to designate a divided layer to be irradiated. The numerical control apparatus 70 is configured to read the project file generated by the CAM device 60, the project file including the main program file, cutting program file and molding program file (laser irradiation program file), via a removable storage medium such as a flash memory, a communication line and the like. Further, the numerical control apparatus 70 comprises an operation unit 71 and storage unit 73.

The operation unit 71 (one example of "calculating means" in Claims) executes a variety of calculations pertinent to a numerical control. For example, the operation unit 71 analyzes the main program file and cutting program file, and outputs a command signal to each control device to execute the main program for each program line. In FIG. 5, as a representative example, the control of the molding table 5, recoater head 11, laser beam emitter 13, imaging unit 41, and cutting machine 50 are shown; however, it is not intended to be limited to these.

The storage unit 73 stores data regarding the numerical control apparatus 70, temporary variable values with respect to the operation of the operation unit 71, and the like. In particular, the storage unit 73 stores amount of displacement. The details thereof will be described later.

The display device 74 is connected to the numerical control apparatus 70 and displays a recommended value, in particular the size of the cutting allowance, of the data relating to the numerical control apparatus 70 on the screen, and a warning that maintenance or inspection is necessary. The details of these will be described later.

(Lamination Molding Method)

Subsequently, referring to FIGS. 1 and 6-8, the lamination molding method using the afore-mentioned lamination molding apparatus will be explained. Note that in FIGS. 6-8, in consideration of visibility, some of elements shown in FIG. 1 are omitted. The procedure of the lamination molding method shown below is executed based on the project file generated in advance.

First, the molding plate 7 is placed on the molding table 5, and the height of the molding table 5 is adjusted to an appropriate position as shown in FIG. 6. In this state, the recoater head 11 with the material holding section 11a being filled with the material powder is moved from the left side to the right side of the molding region R, in the direction shown by arrow B in FIG. 1. Accordingly, a first layer of the material powder layer 8 is formed on the molding plate 7.

Subsequently, predetermined portion of the material powder layer 8 is irradiated with the laser beam L, thereby sintering the portion of the material powder layer 8 being irradiated with the laser beam. Accordingly, the first layer of sintered layer 81f being a divided layer having a predetermined thickness with respect to an entire lamination molded object is obtained as shown in FIG. 7.

Then, the height of the molding table 5 is descended by the predetermined thickness (one layer) of the material powder layer 8. Subsequently, the recoater head 11 is moved from the right side to the left side of the molding region R. Accordingly, a second layer of the material powder layer 8 is formed on the sintered layer 81f.

Next, predetermined portion of the material powder layer 8 is irradiated with the laser beam L, thereby sintering the portion of the material powder layer 8 being irradiated with the laser beam. Accordingly, the second layer of sintered layer 82f is obtained as shown in FIG. 8.

By repeating these procedures, the third and subsequent layers of sintered layers are formed. The adjacent sintered layers are firmly fixed with each other.

Every time the plurality of the sintered layers are formed, a cutting process is performed for cutting the sintered layer using the rotational cutting tool attached to the spindle head 60, and removing the cutting allowance. Also, after forming the necessary number of the sintered layers, the sintered body can be obtained by removing unsintered material powder. This sintered body can be used as a mold for resin molding, for example.

(Correction Method)

Figure 9:
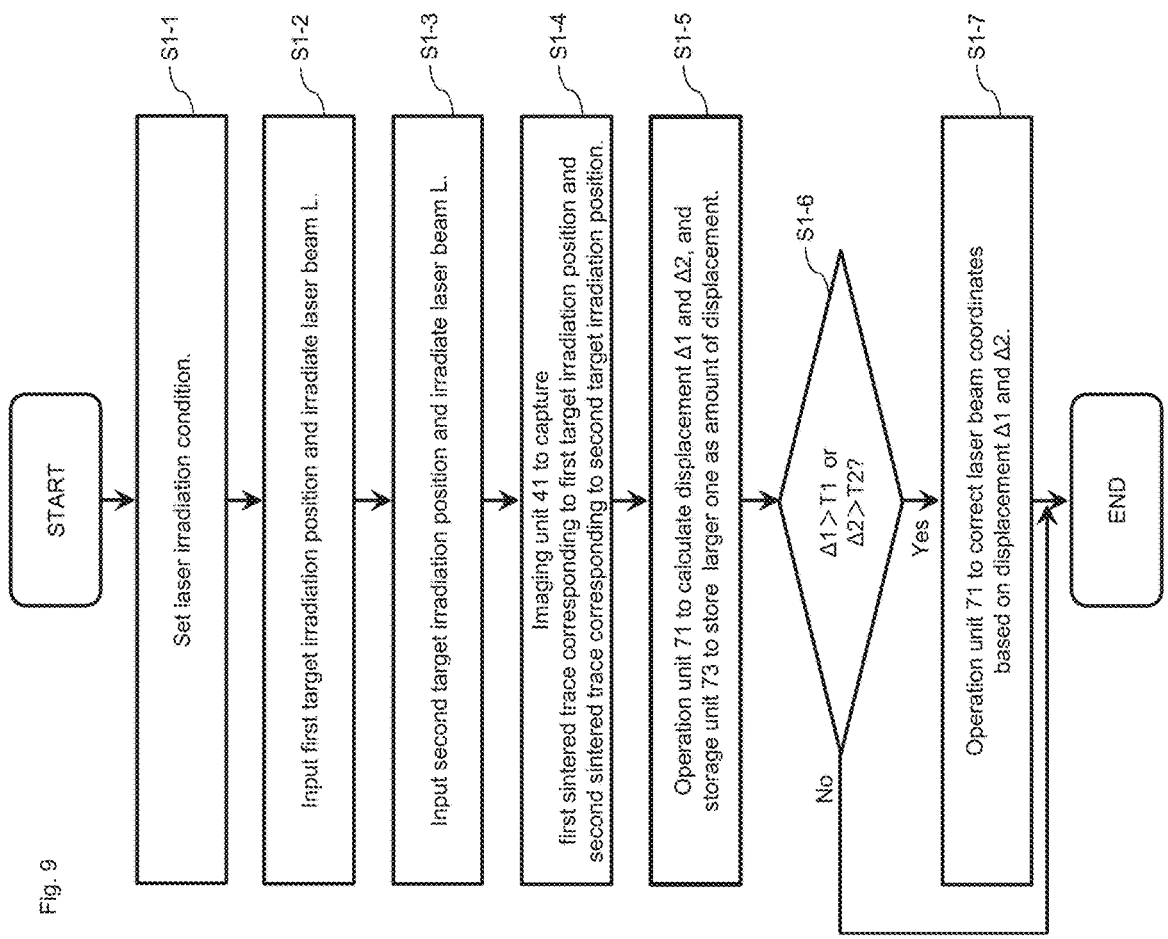
FIG. 9 is a flowchart showing a correction method using a lamination molding apparatus according to one embodiment of the present invention.
Figure 10:
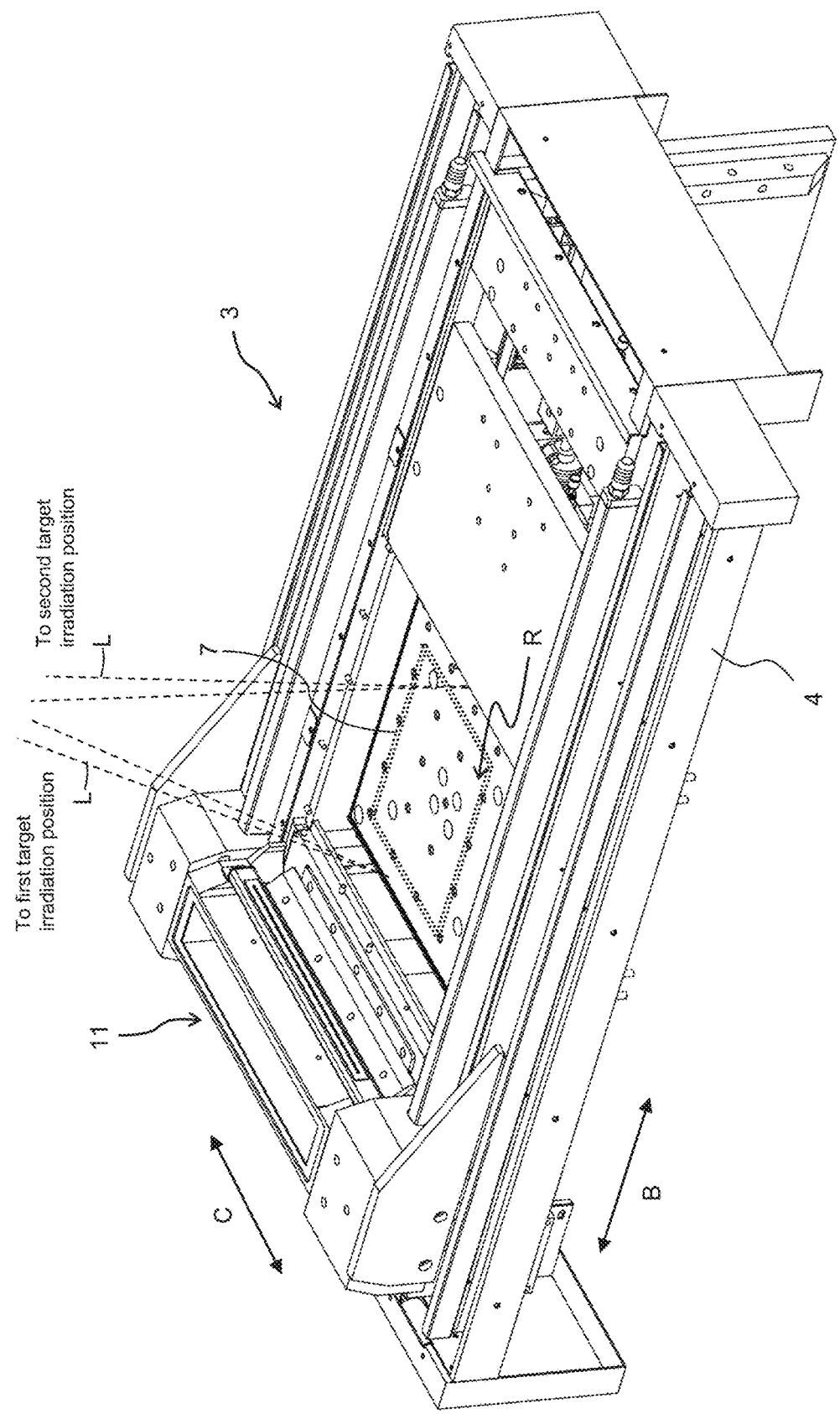
FIG. 10 is an explanatory diagram of measurement points of the amount of displacement in the lamination molding apparatus according to one embodiment of the present invention.

Next, according to FIGS. 9 and 10, a correction method of correcting the irradiation position coordinates of the laser beam L (laser beam coordinates) output from the laser beam emitter 13 will be described. In the embodiment of the present invention, the correction method is to be performed once or plural times at predetermined timing (for example, each time one or more of the sintered layers are formed) during the molding. Of course, it may be done before starting the molding of the first layer of the sintered layers. Hereinafter, description will be given along each step of FIG. 9.

[Start]

(Step S1-1)

First, laser irradiation condition suitable for forming the sintered trace is set, which is, for example, the intensity of the laser, spot diameter, irradiation position and the like. Here, the irradiation position includes first and second target irradiation positions. Also assume that the first and second target irradiation positions (the measurement points) are located on the molding table 5 and outside the area where the lamination molded object is molded. As shown in FIG. 10, the first target irradiation position and second target irradiation position are assumed positioned in a margin region, which is located outside of the molding plate 7 on the molding table 5. In the molding process of a predetermined lamination molded object, the margin region is a region in which the lamination molded object is never formed regardless of the shape of a desired lamination molded object. Therefore, if the first target irradiation position and second target irradiation position are set within the margin region, the set of each target irradiation position in consideration of the shape of the molded object may not be necessary, which is preferable.

(Step S1-2)

The rotation controlling signal corresponding to the first target irradiation position is input to the galvanometer mirrors 43a and 43b, respectively. The angular positions of galvanometer mirrors 43a and 43b are respectively changed in response to the rotation controlling signal. As shown in FIG. 10, the laser beam L emitted from the laser beam source 42 is irradiated on a predetermined position corresponding to the first target irradiation position, through the galvanometer mirrors 43a and 43b. The region is covered with the material powder, and the first sintered trace is formed by sintering part of the material powder.

(Step S1-3)

The rotation controlling signal corresponding to the second target irradiation position is input to the galvanometer mirrors 43a and 43b, respectively. The angular positions of galvanometer mirrors 43a and 43b are respectively changed in response to the rotation controlling signal. As shown in FIG. 10, the laser beam L emitted from the laser beam source 42 is irradiated on a predetermined position corresponding to the second target irradiation position, through the galvanometer mirrors 43a and 43b. The region is covered with the material powder, and the second sintered trace is formed by sintering part of the material powder.

(Step S1-4)

The imaging unit 41 captures the first and second sintered traces formed in Steps S1-2 and S1-3. Using the image including the first and second sintered traces captured in Step S1-4, the operation unit 71 calculates an actual irradiation position corresponding to the first target irradiation and an actual irradiation position corresponding to the second target irradiation position. Preferably, the actual irradiation position is calculated as a predetermined characteristic point in the sintered trace. If the spot shape of the sintered trace is substantially a circle, the actual irradiation position may be substantially the center position of the circle. Alternatively, the laser beam L may be scanned such that the sintered trace trajectory forms a ring shape, cross shape or the like. In such cases, the actual irradiation position is substantially the center position of the ring or the intersection position of the cross. For example, the imaging unit 41 attached to the machining head 57 moving in synchronization with the vertical one-axis and the horizontal two-axis directions moves, until the center position of an image to be captured matches the first target irradiation position in the spindle coordinates system, and capture the image including the first the sintered trace. Similarly, the imaging unit 41 moves, until the center position of an image to be captured matches the second target irradiation position in the spindle coordinates system, capture an image including the second the sintered trace. Then, the operation unit 71 may calculate a first actual irradiation position in the spindle coordinates system corresponding to the first target position from the image including the first sintered trace captured, and further may calculate a second actual irradiation position in the spindle coordinates system corresponding to the second target position from the image including the second sintered trace captured.

(Step S1-5)

Subsequently, the operation unit 71 calculates displacement Δ1 between the first target irradiation position and first actual irradiation position, and displacement Δ2 between the second target irradiation position and second actual irradiation position. Further, the larger one of the values of the displacement Δ1 and Δ2 is stored as "the amount of displacement" in the storage unit 73. The amount of displacement is used in the recommended value determination method of the cutting allowance described later.

(Step S1-6)

Further, the operation unit 71 compares the displacement Δ1 and a predetermined threshold value T1, and compares the displacement Δ2 and a predetermined threshold value T2. In the present embodiment, it proceeds to the following step S6 if at least one of the following equations (1) and (2) is fulfilled, and it ends the process if not:

$$\Delta 1 > T1 \tag{1}$$

$$\Delta 2 > T2 \tag{2}$$

(Step S1-7)

The operation unit 71 corrects the irradiation position of the laser beam L such that the target irradiation position input and actual irradiation position of the laser beam L are consistent. As a result, the laser beam coordinates and imaging system coordinates are substantially consistent. Further, the laser beam coordinates and spindle coordinates already having a corresponding relation with the imaging system coordinates are substantially consistent.

[End]

Specifically, it is capable of correcting both components of the translational displacement and rotational displacement. FIGS. 11A-11D show patterns of the translational displacement and rotational displacement for reference. The upper row of FIGS. 11A-11D shows the first target irradiation position and first actual irradiation position, and the lower row shows the second target irradiation position and second actual irradiation position. Also, the outer circle represents the combination of the target irradiation position and actual irradiation position, and the inner circle shows the target irradiation position (not hatched) and actual irradiation position (hatched). The above Δ1 and Δ2 are composed of the translational displacement of X direction Δx, translational displacement of Y direction Δy, and rotational displacement Δθ. It is assumed that the column vector indicating an arbitrary target irradiation position is $p = {}^T(x_p, y_p)$, and the column vector indicating the actual irradiation position corresponding to the target irradiation position is $q = {}^T(x_q, y_q)$. Then, the equation (3) is satisfied;

$$P = A_R q + d \tag{3}$$

wherein $A_R$ is a two-dimensional rotation matrix with a rotate angle $-\Delta\theta$, d is a column vector of which components are the translational displacement ($d = {}^T(\Delta x, \Delta y)$). Accordingly, $A_R$ and d are calculated from Δ1 and Δ2, and thus the actual irradiation position and target irradiation position can be substantially match by the correction shown in equation (3).

Note that, a threshold value for the displacement may be set in the above-described correction method. For example, when the absolute value |Δ1| of the displacement is compared with a threshold T1, the absolute value |Δ2| of the displacement is compared with a threshold T2, at least one of (4) and (5), (or (4') and (5')) is satisfied, the operation unit 71 corrects the irradiation position of the laser beam L.

$$|\Delta 1| > T1 \tag{4}$$

$$|\Delta 2| > T2 \tag{5}$$

$$|\Delta 1| \geq T1 \tag{4'}$$

$$|\Delta 2| \geq T2 \tag{5'}$$

(Cutting Allowance)

Figure 12:
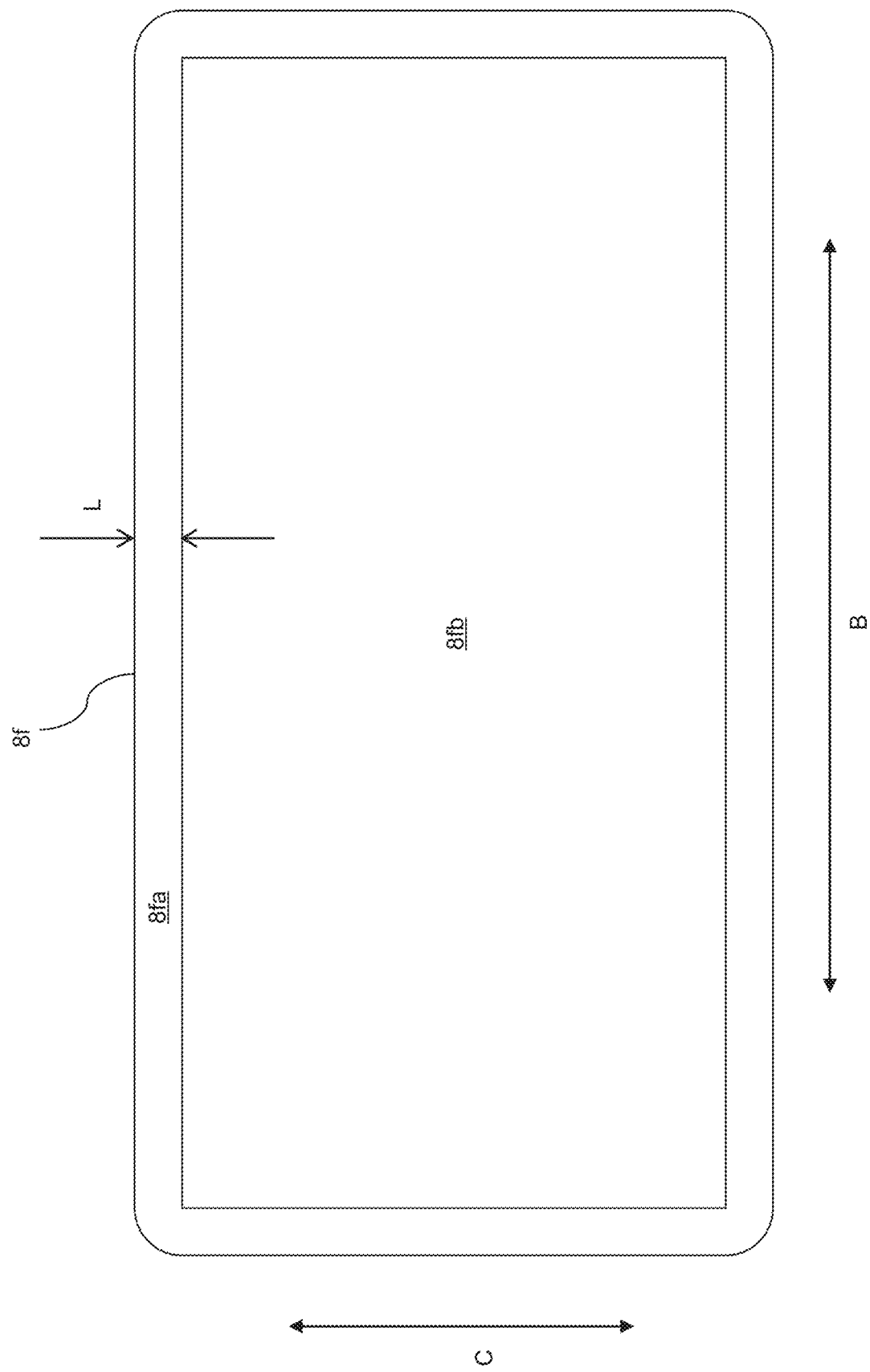
FIG. 12 is a schematic view for explaining the cutting allowance 8fa according to one embodiment of the present invention.

Subsequently, the cutting allowance and a recommended value of the size thereof (for simplicity, merely referred to as recommended value) will be described. As shown in FIG. 12, the cutting allowance 8fa is formed during the molding of the lamination molded object, and is a portion with a certain size L in the outer direction of the sintered body 8f composed of a plurality of the sintered layers obtained by sintering the material powder layer 8. This portion is cut and removed from the sintered body 8f using the cutting tool in the cutting machine 50 at a predetermined timing. The remaining portion 8fb forms a part of the desired lamination molded object.

Figure 13:
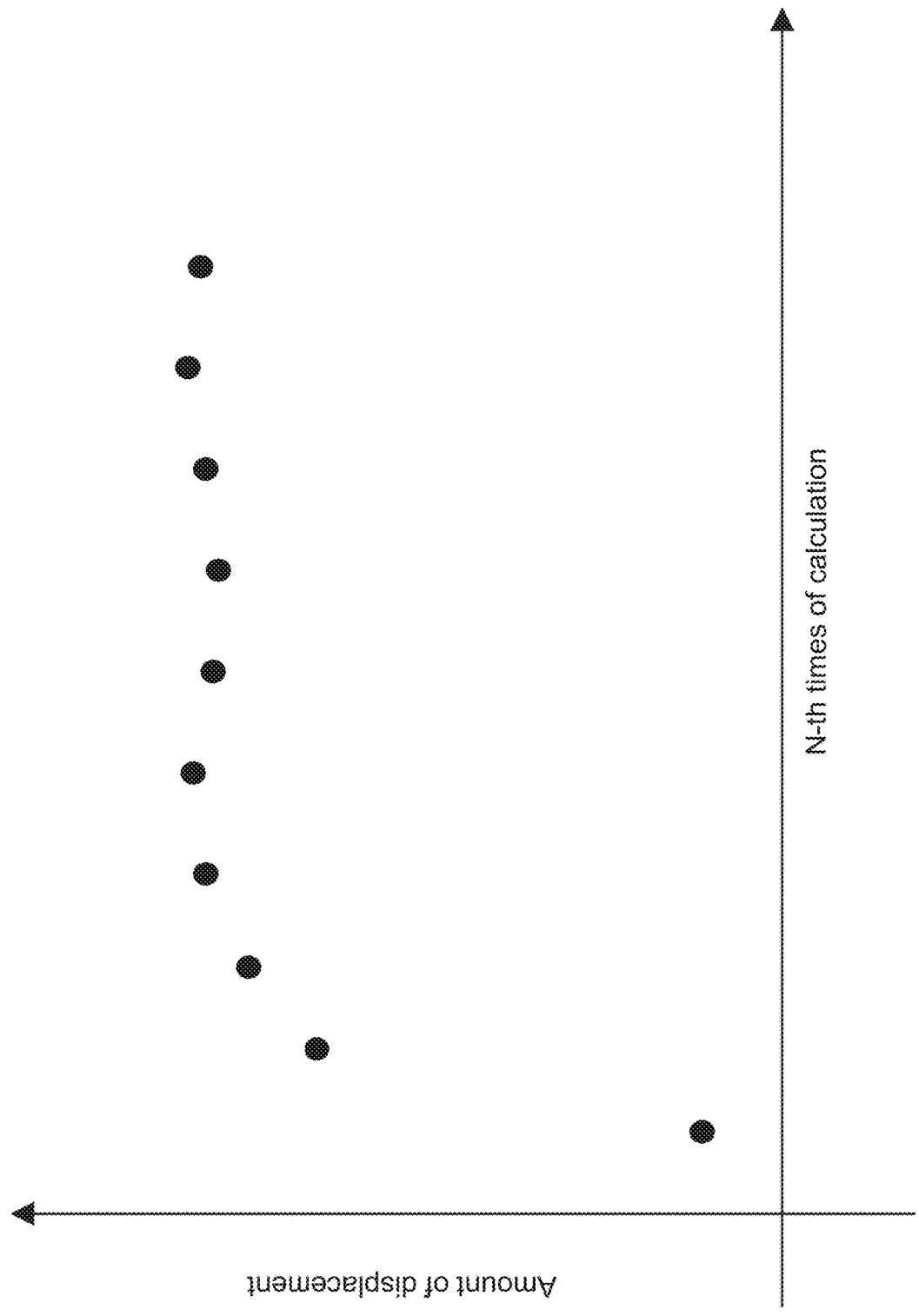
FIG. 13 is a graph showing the time transition of the amount of displacement according to one embodiment of the present invention.
Figure 14:
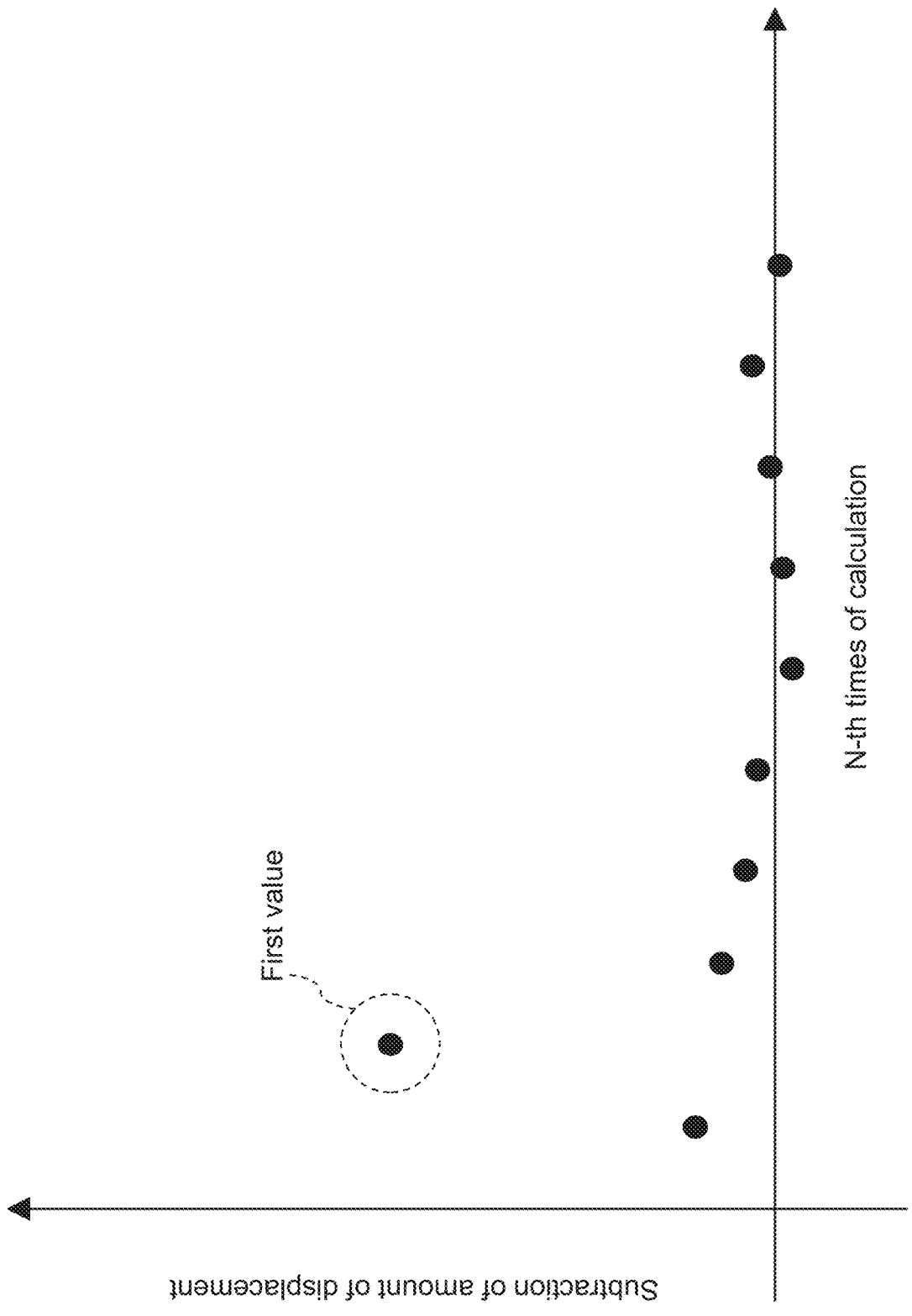
FIG. 14 is a graph showing the time transition of the subtraction of the amount of displacement according to one embodiment of the present invention, which corresponds to FIG. 13 and converges to substantially 0.

Since, as mentioned above, the laser beam coordinates are shifted with time, careful attention must be paid to the setting of the size L of the cutting allowance 8fa when performing the lamination molding method. In the present embodiment, the larger one of the displacements Δ1 and Δ2 is stored in the storage section 73 as the amount of displacement in Step S1-5 of the correction method shown in FIG. 9. Further, since such a correction method is performed a plurality of times at a predetermined timing (for example, a timing of forming one or more the sintered layers) during the molding, if the desired lamination molded object is completed to be molded, the time transition of the amount of displacement as shown in FIG. 13 can be obtained. It should be noted that the time transition of the amount of displacement shown in FIG. 13 does not include the amount of the above-described correction, and merely represents the time transition of the amount of displacement from the initial state. Furthermore, FIG. 14 shows the time transition of the subtraction of such amount of displacement. That is, the time transition obtained by subtracting the amount of displacement measured at the (n−1) th time from the amount of displacement measured at the n-th time (n=1, 2, 3 . . . ) This can be thought of as representing the time transition of the amount of displacement including the state in which the correction described above is performed.

By the way, there are a lot of heat sources in the lamination molding apparatus, and from the start of the lamination molding method, heat from this heat source causes thermal displacement of various members. In particular, the laser beam emitter 13 emitting the laser beam L at a predetermined position of the material powder layer 8 has a position away from the material powder layer 8 on the molding table 5 as compared with the cutting machine 50 etc. Therefore, it is subject to the influence of positional deviation due to the thermal displacement. For these reasons, generally, as shown in FIG. 14, the absolute value of the subtraction in the early stage, of the absolute value of the subtraction of the amount of displacement each time is normally the largest value (hereinafter referred to as the first value. In this example, the subtraction of the amount of displacement: the value obtained by subtracting the amount of displacement of the first time from the amount of displacement of the second time). Then, if the lamination specification apparatus is operating properly, after a certain period of time, the thermal state of the laser beam emitter 13, chamber 1 and the like are stabilized. Then, as shown in FIG. 14, the subtraction of amount of displacement converges to substantially 0 (an example of "within a predetermined threshold range" in Claims). If there is no significant change in the operating environment such as ambient temperature, some recursion can be expected in the time transition of the subtraction of the amount of displacement.

Therefore, when converging to substantially 0, the size L of the cutting allowance 8fa can be made as small as possible by paying attention to the first value in performing the above-mentioned lamination molding method. In the present embodiment, the operation unit 71 determines that the first value is the recommended value.

Figure 15:
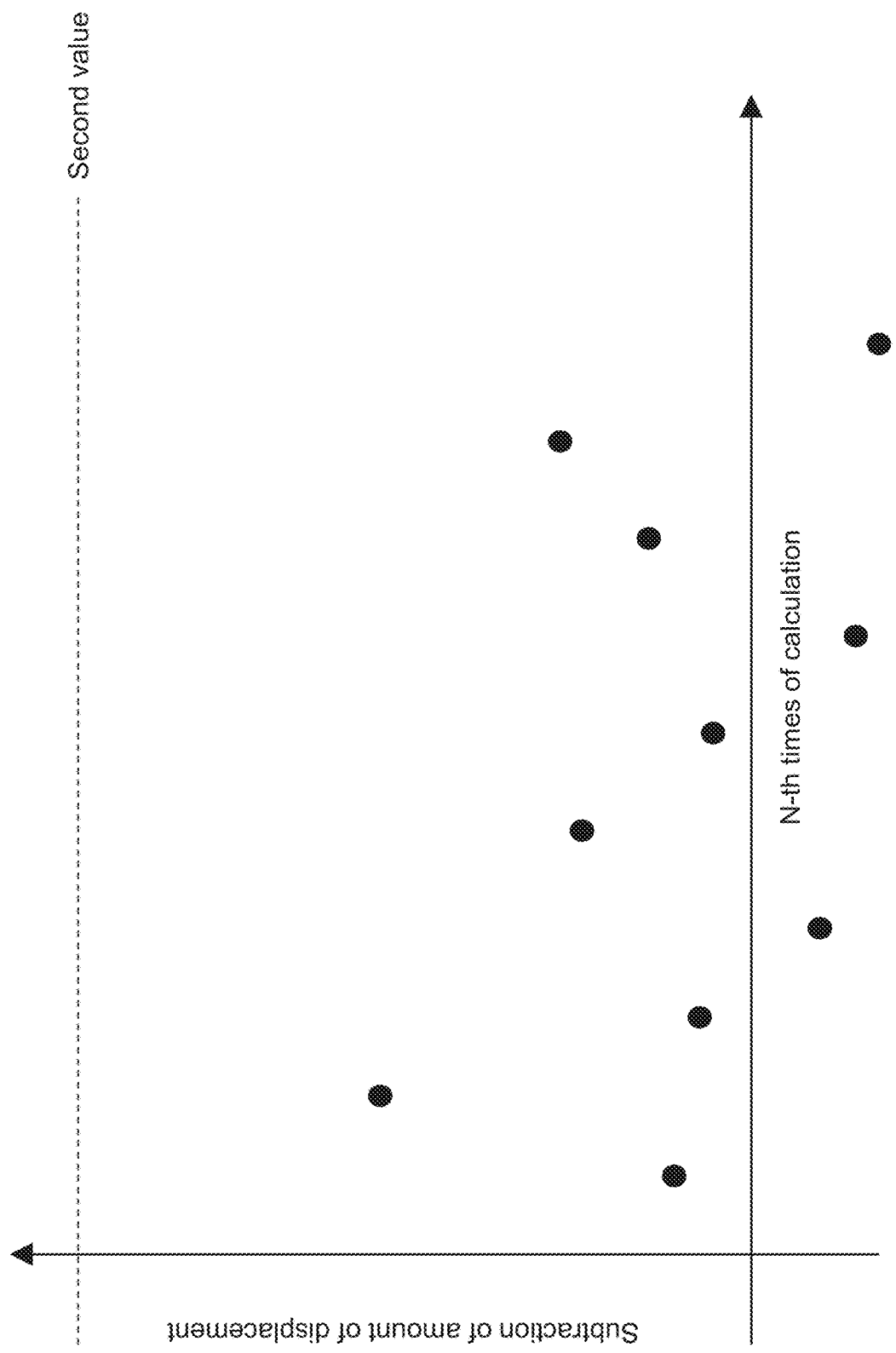
FIG. 15 is a graph showing the time transition of the subtraction of the amount of displacement according to one embodiment of the present invention, which does not converge to substantially 0.

On the other hand, as shown in FIG. 15, the thermal state of the laser beam emitter 13, the inside of the chamber 1 or the like is unstabilized and the subtraction of displacement may not converge to substantially 0 even if some time has elapsed. In such a case, since the above-described recursion cannot be expected, it is preferable not to decide the first value as the recommended value. In the present embodiment, the second value predetermined and larger than the first value (preferably, the maximum value that can be set by the specification of the apparatus) is determined as the recommended value.

(Methods of Determining Recommended Value and Generating Project File)

Subsequently, the determination method of the recommended value and the method of generating the project file using the recommended value will be described with reference to the flowcharts shown in FIGS. 16 and 17.

[Start: Analysis]

(Step S2-1)

Upon completion of molding the desired lamination molded object, the operation unit 71 in the numerical control apparatus 70 analyzes the time transition of the subtraction of the amount of displacement stored in the storage unit 73. At this time, the first value is specified and it is judged whether the subtraction of the amount of displacement converges within a predetermined threshold range, for example, substantially 0.

(Steps S2-2, S2-3a, S2-4a)

As a result of the analysis, when the subtraction of the amount of displacement converges to substantially 0, the first value is determined as the recommended value by the operation unit 71. Then, with respect to the recommendation value, the screen of the display device 74 displays "The recommended cutting allowance is <the first value>!" etc.

(Steps S2-2, S2-3b, S2-4b)

On the other hand, as a result of the analysis, when the subtraction of the amount of displacement does not converge to substantially 0, the second value is determined as the recommended value by the operation unit 71. Then, with respect to the recommended value, the screen of the display device 74 displays "Maintenance should be performed because the molding position is not stabilized. The recommended cutting allowance is the maximum value <the second value>!" etc.

(Step S2-5)

From the Numerical Control apparatus 70, the analysis result including the recommended value and presence/absence of convergence is transferred to the CAM apparatus 65. With this step, the numerical control apparatus 70 ends execution of the project file.

[End]

[Start: Generating Project File]

(Step S3-1)

The CAM apparatus 65 starts generating the project file based on the analysis result.

That is, the CAM apparatus 65 refers to the analysis result transferred from the numerical control apparatus 70.

(Steps S3-2, S3-3a)

Here, when automatic setting is set so that the size L of the cutting allowance 8 fa is set as the recommended value, the project file having the recommended value as the size L of the cutting allowance 8 fa is newly generated.

(Steps S3-2 and S3-3b)

On the other hand, if the automatic setting is not made so as to set the size L of the cutting allowance 8fa to the recommended value, the size L of the cutting allowance 8fa is determined based on the input of the operator operating the CAM apparatus 65. Of course, this input may use the recommended value as it is, or other values may be set appropriately. Based on this input, the project file is newly generated.

[End]

In reverse, the newly generated project file is transferred from the CAM apparatus 65 to the numerical control apparatus 70 using various transfer means. The project file generated in this manner enables to shorten the molding time of the lamination molded object by reducing the size L of the cutting allowance 8fa as much as possible for the molding of the lamination molded object from the next time, and by shortening the time of cutting the cutting allowance 8fa as much as possible. In particular, it is preferable to mold the lamination molded object using the project file generated based on the recommendation value obtained during the molding of the lamination molded object of the "previous time."

2. MODIFIED EXAMPLE

The present invention can also be implemented in the following modes.

First, in the above embodiment, although a pair of the galvanometer mirrors 43a and 43b are selected as a scanning means of the laser beam L, the laser beam L may also be scanned by another means.

Secondly, the target irradiation position may be one, or three or more. If it is one, higher accuracy correction can be achieved using the target irradiation position as the origin of the laser beam coordinates system; however, we note that it is impossible to correct the displacement of the rotational component.

Thirdly, the amount of displacement may be calculated for each irradiation position with respect to measurement. In such a case, as for the determination whether the subtraction of the amount of displacement has converged to substantially 0 or not, it is analyzed whether the subtraction of all amount of displacement with respect to each irradiation position converges to substantially 0 or not.

Fourthly, the recommendation value may be determined without performing the correction (step S1-7 in FIG. 9) by the correction method described above. In such a case, it is preferable to determine the maximum value of the absolute value of the amount of displacement itself instead of the first value which is the maximum value of the subtraction of the amount of displacement as the recommended value.

Fifthly, in the measurement (including the correction) of the amount of displacement, it is not limited to the above-mentioned method in which the actual irradiation position of the laser beam L is measured by capturing the sintered trace by the imaging unit 41. For example, instead of the imaging unit 41, a light receiving element such as a photodiode may be provided and the actual irradiation position may be measured by irradiating the laser beam L directly to the light receiving element.

Sixthly, instead of determining the recommended value and generating the project file as separate steps, for example, it can be implemented so that the CAM apparatus 65 or operation unit 71 calculates the amount of displacement, and generate a new project file including the size of the cutting allowance determined based on the time transition of the amount of displacement.

Figure 16:
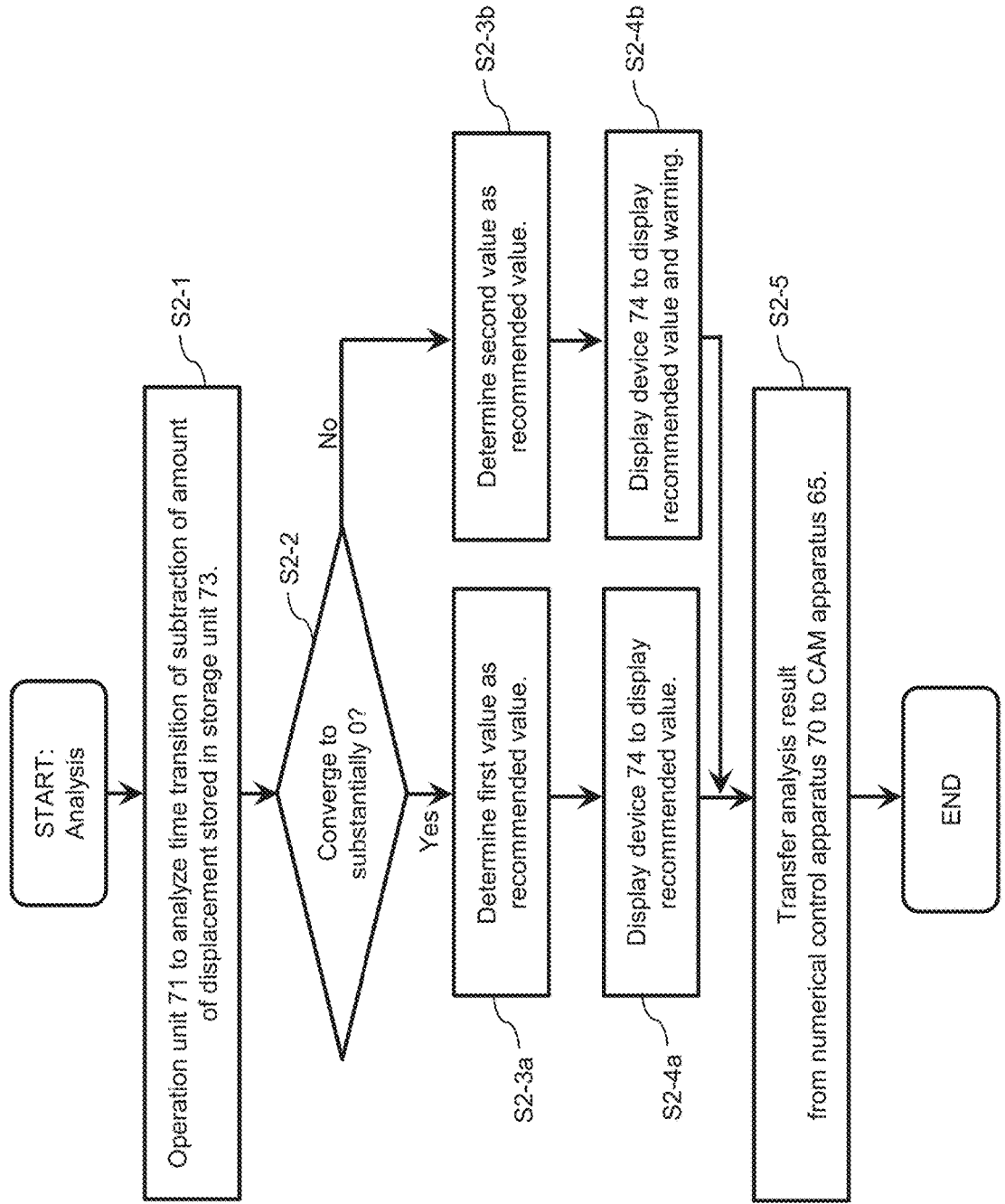
FIG. 16 is a flowchart showing a method of determining the recommended value using the lamination molding apparatus according to one embodiment of the present invention.

Seventhly, in Step S2-3b of FIG. 16, the numerical control apparatus 70 may allow the display device 74 to display the warning in Step S2-4b including that the recommended value could not be measured when the subtraction of the amount of displacement does not converge to substantially 0 as a result of analysis. Therefore, in Step S3-3a of FIG. 17, if the analysis value indicates that the recommended value could not be measured, the CAM apparatus 65 which has stored the second value in advance may determine the second value as the recommended value and newly generate the project file having the recommended value as the size L of the cutting allowance 8fa. Furthermore, if the analysis result indicates that the measurement could not be achieved, the CAM apparatus 65 may automatically select the step S3-3b in FIG. 17 and newly generate the project file with the size L of the cutting allowance 8fa based on the input by an operator.

Eighthly, the analysis result may be stored in the storage unit 73 of the numerical control apparatus 70 and transferred at the appropriate time in response to the CAM apparatus 65 or the transfer request from an operator. In that case, the flow chart is ended by omitting the step S2-5 for transferring the analysis result in the flowchart indicating the determination method of recommended value shown in FIG. 16.

Ninthly, means for transferring the analysis result includes use of a communication line, and a removable storage medium such as a flash memory. In the numerical control apparatus 70, the means for transferring the analysis result includes the following modes; a printing device (not shown) to print the result, an operator to record on a paper or the like by looking at the display device 74, the operator to memorize by looking at the display device 74 and directly to input it for the CAM apparatus 65.

Figure 17:
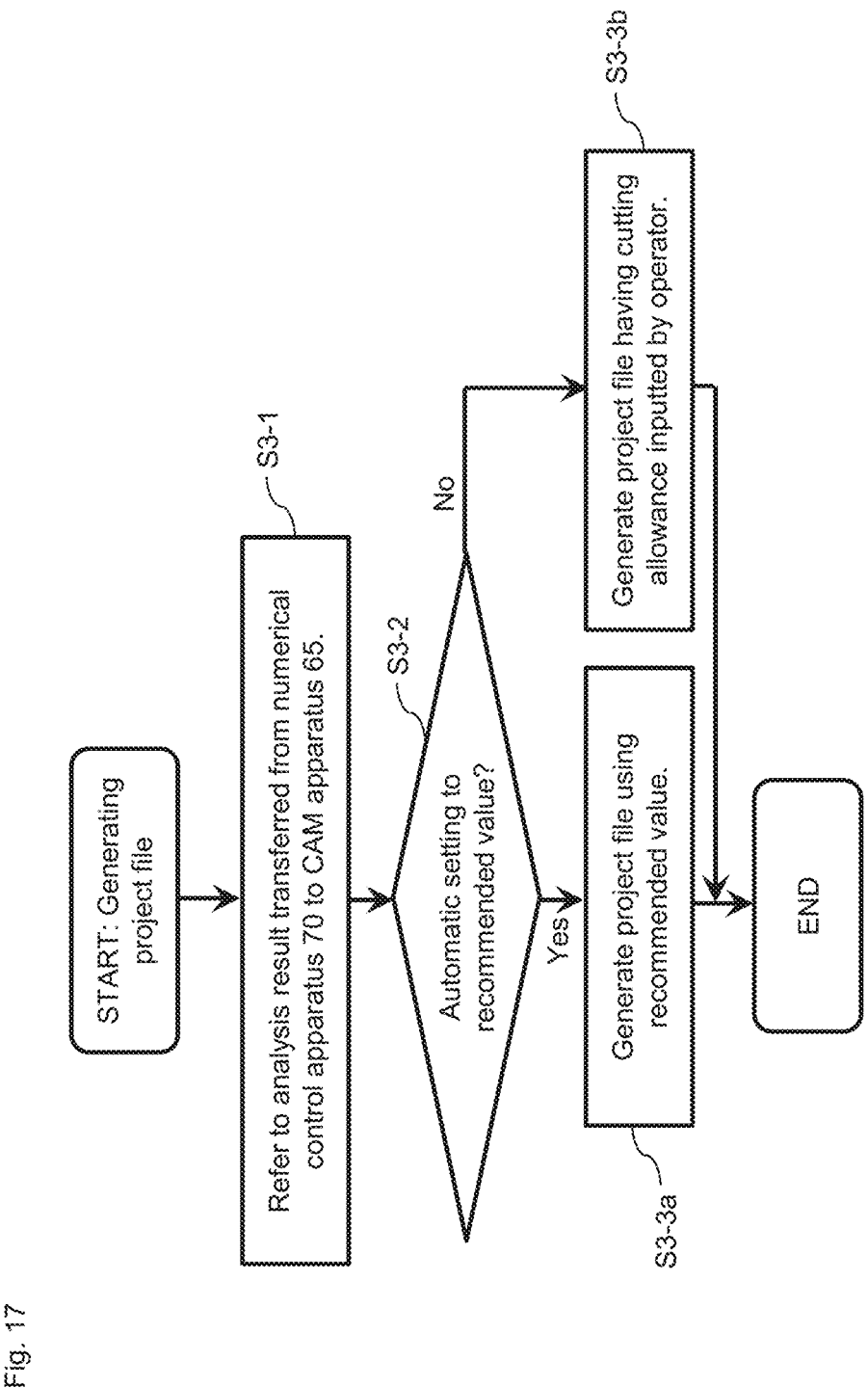
FIG. 17 is a flowchart showing a method of generating the project file based on the recommended value using the lamination molding apparatus according to one embodiment of the present invention.

Tenthly, in Step S3-1 of FIG. 17, the reference to the analysis result includes that after the flow starts, the analysis result transferred from the numerical control apparatus 70, stored beforehand in the CAM apparatus 65, is read out. In Step S3-1 of FIG. 17, the reference to the analysis result includes that after the flow starts, the analysis result transferred timely in response to a request for starting the transfer for the numerical control apparatus 70 or operator, is read out after the flow starts.

Eleventhly, the generation of the project file based on the recommendation value may start as soon as the analysis result is transferred from the numerical Control apparatus 70 to the CAM apparatus 65.

Twelfthly, in Steps S3-2 and S3-3a in FIG. 17, a value obtained by adding a certain play value to the recommended value is set as the size L of the cutting allowance 8fa so that the project file is newly generated.

Thirteenthly, a step in which the project file newly generated by the CAM apparatus 65 is transferred to the numerical control apparatus 70 may be added after Step S3-3a or S3-3b in FIG. 17.

3. CONCLUSION

Although embodiments of the present invention and modifications thereof have been described, they have been presented as examples and are not intended to limit the scope of the invention. These novel embodiments can be implemented in various other forms, and various omissions, substitutions, and changes can be made without departing from the spirit of the invention. These embodiments and modifications thereof are included in the scope and gist of the invention and are included in the invention described in the claims and the equivalent scope thereof.

EXPLANATION OF SYMBOLS

1: chamber
1a: window
1b: chamber supplying opening
1c: chamber discharging opening
1d: molding region
1e: sub supplying opening
1f: sub discharging opening
3: powder layer firming apparatus
4: base
5: molding table
7: molding plate
8: material powder layer
8f: sintered body
8fa: cutting allowance
8fb: remaining portion
11: recoater head
11a: material holding section
11b: material supplying section
11c: material discharging section
11fb, 11rb: blade
11fs: recoater head supplying opening
11rs: recoater head discharging opening
13: laser beam emitter
15: inert gas supplying apparatus
15a: first inert gas supplying apparatus
15b: second inert gas supplying apparatus
17: fume diffusing device
17a: cylindrical housing
17b: opening
17c: cylindrical diffusing member
17d: inert gas supplying space
17e: pore
17f: clean room
19: fume collector
21, 23: duct box
26: powder retaining wall
31: molding table drive mechanism
41: imaging unit
42: laser beam source
43a, 43b: galvanometer mirror
44: focus control unit
50: cutting machine
57: machining head
60: spindle head
65: CAM apparatus
70: numerical control apparatus
71: operation unit
73: storage unit
74: display device
81f, 82f: sintered layer

The invention claimed is:

1. A lamination molding apparatus configured to mold a desired lamination molded object based on a project file, comprising: a chamber covering a molding region and being filled with an inert gas; a laser beam emitter configured to irradiate material powder with a laser beam for sintering the material powder, in an irradiation region on a material powder layer formed on a molding region, a cutting machine configured to move a cutting tool, within the chamber, for cutting a predetermined cutting allowance from a sintered layer obtained by sintering the material powder, an imaging unit or a photodiode, and a calculation means configured to calculate an amount of displacement between a target irradiation position and an actual irradiation position of the laser beam, and to determine a recommended value of a size of the cutting allowance based on a time transition of the amount of displacement or to generate a new project file containing a size of the cutting allowance set based on a time transition of the amount of displacement.

2. The apparatus of claim 1, wherein:
the calculating means is an arithmetic unit which determines a recommended value of the size of the cutting allowance based on the time transition of the amount of displacement; and further comprising:
a computer aided manufacturing (CAM) apparatus configured to generate the new project file in which the size of the cutting allowance is set based on the recommended value.

3. The apparatus of claim 1, wherein:
the apparatus is configured to mold the desired lamination molded object based on the generated new project file.

4. The apparatus of claim 3, wherein:
the apparatus is configured to mold the desired lamination molded object based on the generated new project file at a previous operation of the lamination molding apparatus.

5. The apparatus of claim 1, wherein:
the calculation means is configured to calculate time subtractions of the amount of displacement.

6. The apparatus of claim 5, wherein:
the calculation means is configured to determine a first value having a largest absolute value among the time subtractions as the recommended value if the time subtractions converge within a predetermined threshold range.

7. The apparatus of claim 6, wherein:
the calculation means is configured to determine a predetermined second value larger than the first value as the recommended value if the time subtractions do not converge within a predetermined threshold range.

8. The apparatus of claim 1, further comprising:
a display device configured to display the recommended value on a screen.

9. The apparatus of claim 8, wherein:
the display device is configured to display a warning that the apparatus itself needs maintenance and inspection if the time subtractions do not converge within a predetermined threshold range.

10. The apparatus of claim 1, further comprising: a molding table configured to be controllable in a vertical direction within the chamber, wherein the imaging unit is configured to capture a subject on the molding table, wherein: the laser beam emitter is configured to sinter the material powder on the molding table and outside the region in which the desired lamination molded object is molded, thereby forming the sintered trace; the imaging unit is configured to capture the sintered trace; and the calculating means is configured to determine the actual irradiation position from the sintered trace captured by the imaging unit and to compare the actual irradiation position with the target irradiation position, thereby calculating the amount of displacement.

* * * * *